United States Patent
Voit et al.

(10) Patent No.: US 6,798,751 B1
(45) Date of Patent: Sep. 28, 2004

(54) CUSTOMER PREMISES EQUIPMENT FOR VERTICAL SERVICES INTEGRATION

(75) Inventors: Eric A. Voit, Bethesda, MD (US); Robert T. Baum, Gaithersburg, MD (US)

(73) Assignee: Verizon Communications Inc., New York, NY (US)

( * ) Notice: Subject to any disclaimer, the term of this patent is extended or adjusted under 35 U.S.C. 154(b) by 111 days.

(21) Appl. No.: 09/731,054

(22) Filed: Dec. 7, 2000

Related U.S. Application Data

(63) Continuation-in-part of application No. 09/635,695, filed on Aug. 10, 2000.

(51) Int. Cl.[7] .................................................. H04J 3/16
(52) U.S. Cl. ..................... 370/252; 370/469; 709/230
(58) Field of Search ................................ 370/252, 231, 370/352, 389, 395, 401, 402, 412, 413, 428, 465, 466, 467, 469; 709/225, 227, 230, 236, 223; 376/351, 392, 395.32, 395.5

(56) References Cited

U.S. PATENT DOCUMENTS

| | | | |
|---|---|---|---|
| 5,247,347 A | 9/1993 | Litteral et al. | 725/114 |
| 5,410,343 A | 4/1995 | Coddington et al. | 725/99 |
| 5,621,728 A | 4/1997 | Lightfoot et al. | 370/397 |
| 5,650,994 A | 7/1997 | Daley | 370/259 |
| 5,774,689 A | 6/1998 | Curtis et al. | 703/21 |
| 5,790,548 A | 8/1998 | Sistanizadeh et al. | 370/401 |
| 5,812,786 A | 9/1998 | Seazholtz et al. | 709/223 |
| 5,881,131 A | 3/1999 | Farris et al. | 379/15.03 |
| 5,905,781 A | 5/1999 | McHale et al. | 379/93.14 |
| 5,958,016 A | 9/1999 | Chang et al. | 709/229 |
| 6,018,767 A * | 1/2000 | Fijolek et al. | 709/218 |
| 6,049,531 A * | 4/2000 | Roy | 370/260 |
| 6,081,517 A | 6/2000 | Liu et al. | 370/352 |
| 6,091,709 A * | 7/2000 | Harrison et al. | 370/235 |
| 6,108,350 A * | 8/2000 | Araujo et al. | 370/467 |
| 6,118,785 A * | 9/2000 | Araujo et al. | 370/401 |
| 6,144,668 A * | 11/2000 | Bass et al. | 370/401 |
| 6,205,148 B1 * | 3/2001 | Takahashi et al. | 370/401 |
| 6,219,707 B1 * | 4/2001 | Gooderum et al. | 709/225 |
| 6,253,327 B1 * | 6/2001 | Zhang et al. | 713/201 |

* cited by examiner

*Primary Examiner*—Brian Nguyen
(74) *Attorney, Agent, or Firm*—Leonard C. Suchyta, Esq.; Michael Stewart, Esq.

(57) ABSTRACT

Offering vertical services to subscribers and service providers is an avenue to immediately improve the competitiveness of digital subscriber line access service, for example of the type offered by a local exchange carrier. To deliver high-quality vertical services, however, the underlying ADSL Data Network (ADN) or the like needs to establish Quality of Service (QoS) as a core characteristic and offer an efficient mechanism for insertion of the vertical services. The inventive network architecture introduces QoS into the ADN, in a manner that enables the delivery of sophisticated and demanding IP-based services to subscribers, does not affect existing Internet tiers of service, and is cost-effective in terms of initial costs, build-out, and ongoing operations. The architecture utilizes a switch capable of examining and selectively forwarding packets or frames based on higher layer information in the protocol stack, that is to say on information that is encapsulated in the layer-2 information utilized to define normal connectivity through the network. The switch enables segregation of upstream traffic by type and downstream aggregation of Internet traffic together with traffic from a local vertical services domain. Customer Premises Equipment (CPE) located between the ADN and customer premises data equipment examines frames received from the data equipment and modifies the frames according to the destination of the frames' payloads. This CPE also enforces QoS guarantees in the upstream direction and security-related access control lists.

27 Claims, 15 Drawing Sheets

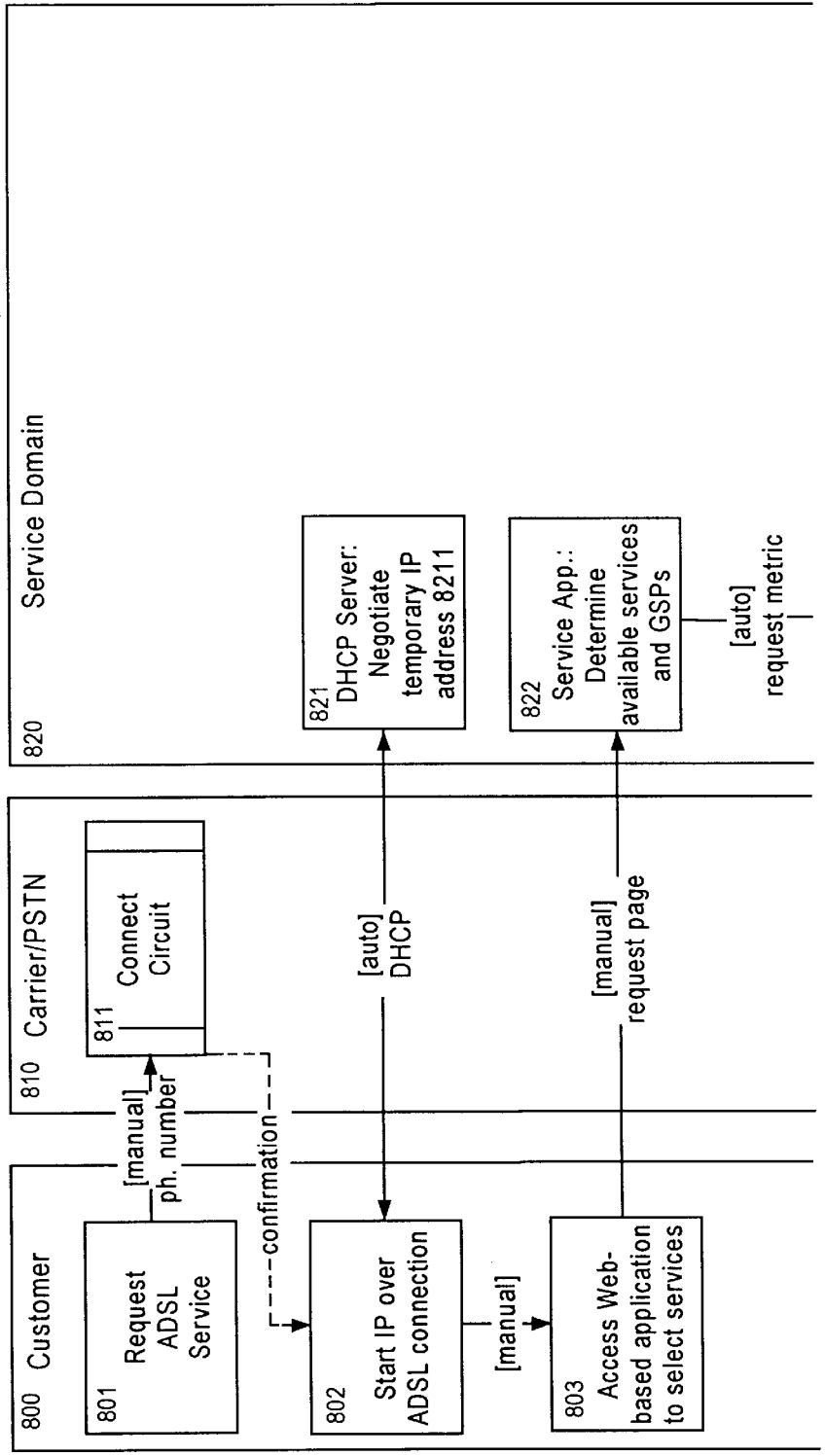

US 6,798,751 B1

CUSTOMER PREMISES EQUIPMENT FOR VERTICAL SERVICES INTEGRATION

RELATED APPLICATIONS

This application is a continuation in part of U.S. patent application Ser. No. 09/635,695, filed Aug. 10, 2000 entitled "SUPPORT FOR QUALITY OF SERVICE AND VERTICAL SERVICES IN DIGITAL SUBSCRIBER LINE DOMAIN" and U.S. patent application Ser. No. 09/652,140, filed Aug. 31, 2000 entitled, "AUTOMATED SERVICE PROVISIONING IN COMBINATION OF VERTICAL SERVICES AND DIGITAL SUBSCRIBER LINE DOMAINS", the disclosures of which are incorporated herein entirely by reference.

FIELD OF THE INVENTION

Certain concepts involved in the present invention relate to techniques for implementing data communication services, for example in a local access network utilizing digital subscriber line technology, to support quality of service (QoS) and local introduction of vertical services. Other concepts involved in the present invention relate to techniques for automatically provisioning services through such a network. Other concepts involved in the present invention relate to placement of protocol stack shims on equipment that is separate from the devices used by a customer.

BACKGROUND

Modern society continues to create exponentially increasing demands for digital information and the communication of such information between data devices. Local area networks use a network, cable or other media to link stations on the network for exchange of information in the form of packets of digital data. These networks have proven quite successful in providing data communications in commercial applications. However, the common local area network architectures require installation of specialized wiring and use of specific wiring topologies. For example, the most popular network protocols, such as Ethernet, require special rules for the wiring, for example with regard to quality of wire, range of transmission and termination. Furthermore, to extend communications to a wider domain still requires connection of at least one node of the local area network out to a wider area network, such as the network of an Internet Service Provider (ISP). High speed links enabling such wide area access from a LAN domain, for example using T1 lines, are quite expensive and justified only for hi-end commercial users.

The most common form of computer-to-computer communication in use today, particularly for wide area communications, still relies on modems and analog telephone network connections. The telephone-based operation provides the voice grade analog modem a unique power, the necessary connections are virtually ubiquitous. Such modems can communicate via almost any telephone line or wireless telephone (e.g. cellular) to any other such telephone connection, virtually anywhere in the world. The telephone network, however, was designed to provide approximately 3.3 kHz of analog voice bandwidth. Consequently, the data rates that are possible through the telephone network are quite low. Even with a variety of recent enhancements, the data speeds remain at or below 56 kbps.

Integrated Services Digital Network (ISDN) offers somewhat faster data communications and the capacity for concurrent data and voice telephone services. The 160 kb/s capacity carries two bearer (B) channels, each at 64 kb/s, one data (D) channel at 16 kb/s and overhead information in a 16 kb/s embedded operations channel (EOC). The two B-channels may be used separately, for example, for one voice telephone call and one data communication session. The D-channel typically is used for signaling, for call set-up and the like. Some applications allow aggregation of the channels, to combine the B-channels and possibly the D-channel to provide data communications up to the combined rate of 144 kb/s. However, these data rates offered by ISDN already are too slow for many multimedia applications. The high-speed and wide availability of modern personal computers (PCs) continually gives rise to ever more sophisticated multimedia applications. Communications for such applications, typically between the PC and the Internet, already are driving the need for speed to rates far above those available on normal ISDN lines.

A number of technologies are being developed and are in early stages of deployment, for providing substantially higher rates of data communication, for example ranging form 640 kb/s to 7.1 Mb/s. For example, cable television companies are now beginning to offer 'cable modem' services, which allow customers to communicate data over available bandwidth on the coaxial cable of a cable television network. After considering several other options, a number of the local telephone carriers are working on enhancements to their existing copper-wire loop networks, based on various xDSL technologies.

The term xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

The telephone carriers originally proposed use of ADSL and similar high-speed technologies to implement digital video services, for example in networks sometimes referred to as video 'dialtone' networks. The ADSL line technology provided a mechanism for high-speed transport of MPEG encoded video information to video terminal devices in the customers' homes. Examples of such ADSL-based video dialtone networks are disclosed in U.S. Pat. Nos. 5,247,347, 5,410,343 and 5,621,728. The carriers are now deploying a range of xDSL data services targeted at high-speed Internet access and high-speed access to private data networks. U.S. Pat. No. 5,790,548 to Sistanizadeh et al. discloses an example of an ADSL based data network, e.g. for high-speed access to the Internet and to corporate LANs.

The current design goals of DSL data networks for Internet access do not support high-end vertical services, that is to say services demanding IP-based applications that require assurance of some level of quality of service (QoS). For example, packet-switched Voice over IP (VoIP) requires low latency, low jitter (i.e., a relatively constant bit rate), and non-correlated packet loss. Streaming video has similar requirements, and in addition, requires high bandwidth. DSL data networks designed to support high speed Internet and Intranet access have been optimized to support traffic that is bursty and is not sensitive to latency or jitter. For example, current implementations supporting ATM cell traffic employ the Unspecified Bit Rate (UBR) class of service, which does not provide any bandwidth or delay guarantees. Consequently, transport of video materials through such DSL data networks inflicts video delays, loss of audio/video synchronization, and image fragmentation.

Furthermore, lengthy bandwidth intensive sessions for video or other broadband applications may degrade the throughput to all other subscribers served through a shared node, such as a gateway router or a concentrated link. For two-way video, upstream will have even worse quality and throughput problems, due to the best effort nature of the DSL data network implemented for Internet access and because the upstream bandwidth is significantly less than that of the downstream channel.

To appreciate the situation and problems, it may be helpful here to consider an ADSL data implementation of a local access network, as a representative example, in somewhat more detail. FIG. 14 is a block diagram of a typical ADSL data network of the type currently in-use by a number of incumbent and competitive local exchange carriers to provide high-speed access to Internet Service Providers (ISPs) and thus to the Internet. FIG. 15 provides an alternative functional illustration of the elements of such a network. Of particular note, FIG. 15 shows the various protocol stacks in association with the appropriate network elements.

As shown in FIG. 14, a central office (CO) 100 provides plain old telephone service (POTS) and digital subscriber line data service for a number of customers. For purposes of discussion, assume that the equipment at each of the various customer premises 200 connects directly to the CO 100 via twisted pair type copper wiring 300. In an actual implementation, many customers may connect through such wiring to a remote terminal linked to the CO via optical fiber.

At each customer premises 200 in our example, the copper loop 300 carrying both the POTS and ADSL signals connects through a Network Interface Device (NID) 201 placed at the side of the home. A two pair loop is installed from the NID to the location where the ADSL unit 203, typically an ATU-R modem, is located in the home. One pair connects all of the signals on the line 300 from the NID 201 to the ADSL modem 203. Within the ATU-R type modem 203, a passive splitter/combiner type filter segregates the POTS signal and the data signals. The POTS signal is transmitted over the second twisted pair back to the NID 201. The POTS line is then connected to the in-home wiring extensions at the NID 201, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 or other data device (FIG. 15) also sends data to the ADSL modem 203. The modem 203 modulates the upstream data and transmits appropriate signals over the line $300_1$ or $300_2$ to the corresponding modem $113_1$ or $113_2$ in the CO 100 (FIG. 14). The ATU-R interface may support bridging, such that multiple users can share the ADSL modem 203, for two-way data communication through the CO 100.

The lines 300 for the customer premises 200 connect through the main distribution frame (MDF) 101 to a Digital Subscriber Line Access Multiplexer (DSLAM) 111. The DSLAM includes a bank of ADSL terminal units of the type intended for central office applications, identified as ATU-Cs 113. The DSLAM also includes a multiplexer/demultiplexer (MUX) 115.

Within the DSLAM 111, each customer line 300 connects to an assigned ADSL terminal unit 113 in the central office (ATU-C). In the example illustrated, the first customer's line $300_1$ connects through the MDF 101 to a first ATU-C $113_1$ in the CO 100. The second customer's line $300_2$ connects through the MDF 101 to a second ATU-C $113_2$ in the CO 100. The ATU-C type ADSL units 113 include appropriate frequency dependent combiner/splitters, for segregating out the voice telephone traffic. Thus each ADSL unit 113 provides a connection for telephone traffic from the associated line 300 to the POTS switch 103.

The ADSL units 113 in the CO (ATU-Cs) essentially act as modulator/demodulators (modems) for sending and receiving data over the subscriber telephone lines 300. On the network side, each of the ATU-Cs 113 connects to the MUX 115. The MUX 115 multiplexes and demultiplexes the upstream and downstream data for the ADSL modems 113 and provides a connection to a high-speed link 119. Through subtending, the MUX 115 may also provide a data concentration for the communications over the link 119.

In a typical implementation, the concentrated data communications utilize a DS-3 link 119. However, because of increasing traffic demands, it is becoming necessary to upgrade the link 119 to SONET optical fiber, such as OC-3 or in some cases even OC-12. The link 119 provides two-way data communication between the central office 100 and a data hub 121. In practice, this is a relatively long or wide area link using expensive interoffice facilities.

On the upstream side, the high-speed interoffice link 119 terminates on an ATM switch 123 for the ADSL data network (ADN). Although only one link 119 appears in the drawing, the asynchronous transfer mode (ATM) switch 123 will typically service a number of DSLAMs 111 in various end offices via similar DS or OC links. The ATM switch 123, in turn, provides a high-speed connection to a gateway router 125 coupled to an ATM cell relay network 129. Typically, the ATM switch 123 will aggregate traffic from a number of such links 119 onto an OC-3 or higher rate SONET link to the router 125. The router 125 and the cell relay network 129 enable transport of ATM cells for the subscribers to and from equipment of one or more Internet Service Providers (ISPs), shown by way of example as a concentrator 131 coupled to the public packet switched network commonly known as the Internet 132.

The illustrated local access type ADN network provides ATM cell transport from a customer premises 200 to the ISP concentrator 131. The ATM cells serve as the layer-2 routing or switching protocol for the lowest level definition of connectivity between two points of the network. Higher level protocols ride within the ATM cells.

The ATU-Rs 203 and the customer premises data equipment 215 connect via an Ethernet coupler. The customers' equipment communicates across the ADSL data network utilizing Ethernet, and the wide area communication involves transport of Internet protocol information typically in TCP/IP frames within Ethernet frames. The Ethernet frames carrying the TCP/IP frames are adapted into ATM cells. Attention is directed to the protocol stacks illustrated in the lower half of FIG. 15.

To efficiently provide cell relay, each customer is assigned an ATM virtual circuit that extends from the ATU-R 203 in the respective customer premises 200 to the gateway router 125. Although it was originally envisioned that ATM would support switched logical channels or virtual circuits, to date, such logical switching has proven impractical to implement and administer. Consequently, current practical ATM networks actually utilize permanent virtual circuits, not switched virtual circuits. For a given subscriber, the carrier therefore provisions an ATM permanent virtual circuit from the ATU-R 203 to the gateway router 125. The carrier programs one or more nodes along the path of that logical circuit, particularly the DSLAM 111, to regulate traffic on the virtual circuit to the upstream and downstream rates corresponding to the grade of service to which the particular customer subscribers. All data traffic for the subscriber goes over the entire length of the permanent virtual circuit, and most if not all nodes along that path limit that traffic to the rates of the subscription as defined in the provisioning data.

The virtual circuit may be thought of as a solid pipe. All traffic passes through the entire length of the pipe-like virtual circuit, regardless of how many switches or other nodes the circuit passes through. The layer-2 protocol defining the circuit carries all of the higher level traffic end-to-end. Higher layer protocols are visible only at the ends of the pipe. Hence, any traffic flow processing intended to utilize the higher layers must occur at some point past one end or the other end of the virtual circuit.

The gateway router 125 also terminates permanent virtual circuits through the cell relay network 129 going to/from the ISP concentrators 131. The gateway router 125 aggregates traffic between a number of subscribers and each respective ISP. The ISP equipment 131 typically implements a variation of a point-to-point protocol (PPP) specifically adapted to ride over Ethernet, referred to as "PPP over Ethernet" (PPPoE). The virtual circuits to the ISPs, however, do not have sufficient capacity to simultaneously carry all subscriber traffic at the maximum rates of the customers' subscriptions. The MUX 115, the ATM switch 123, and the gateway router 125 concentrate and regulate the subscriber traffic going to and from the ISPs, typically on some type of "best efforts" basis.

In a typical Internet access service offering, the most expensive service tier provides 7.1 Mbps for downstream communication and 680 kbps for upstream communication. The next grade of service provides 1.6 Mbps for downstream communication and 90 kbps for upstream communication, whereas the lowest tier of service provides 640 kbps for downstream communication and 90 kbps for upstream communication. The maximum grade of service offered to an individual subscriber depends on the rates for which the subscriber's line can qualify, although the subscriber may opt for a lower rate service since the higher-rate service is more expensive.

The approach outlined above relative to FIGS. 14 and 15 works well for Internet access if the traffic relates to web access, file transfers and the like, which do not require guaranteed quality of service. Various segments of the Internet industry, however, are rapidly developing new multimedia services and applications that already are pushing the capabilities of such a network. For example, increasingly, Internet traffic includes a number of types of communication that require a guaranteed quality of service. Voice telephone communication over IP is extremely sensitive to latency and jitter. The permanent virtual circuits provide an unspecified bit rate (UBR) service and do not guarantee any minimal amount of delay or jitter. Also, because the rates are set by subscription, the service tends to be relatively inflexible. Some services, such as multicasting of broadband information from the Internet into the local access ADN for a large number of concurrent users, can quickly overload one or more nodes or critical links of the network, for example the link 119 between the DSLAM 111 and the ATM switch 123 at the hub 121.

Most industry experts propose to increase the services available via the public Internet. However, because the higher layer protocols are visible only on the Internet side of the virtual circuit "pipe," these services all must be implemented out past the end of the virtual circuit, at least behind the gateway router 129 and most likely in the public network, where it is possible to view and route based on higher level protocols, particularly Internet protocol (IP). Such a migration strategy to implement new services creates severe problems. For example, in the network of FIG. 14, if a customer at premises 200, desired to order a video on demand, the customer would communicate via the assigned permanent virtual circuit and the ISP to a server on the Internet 132. The server would send the video stream back through the Internet 132, the ISP equipment 131, the cell relay network 129 and the virtual circuit from the router 125 to the ATU-R 203 for handoff to a PC or the like at 215. If the rate of the requested video exceeds the customer's subscription rate, the customer could not view the video in real time during the download. Even if the rate of the requested video is below the customer's subscription rate, loading in the Internet or the local access network may impose delays and/or jitter in communication of some segments of the requested video. Assuming that the hub 121 and the links 119 implement a subscriber concentration, ordering of videos or similar broadband files from the Internet 132 quickly consumes the shared resources through the hub 121 and the links 119, reducing the rates of service provided to other customers seeking concurrent Internet access.

It might be possible to increase the capacity of the links 119 and/or the hubs 121; however, this tends to increase the carrier's recurring costs and often makes the overall service (s) of the ADN network economically impractical.

It has also been suggested to provide customers guaranteed quality of services for some portion of their communications, by segregating the traffic carried between the customer premises and the hub 121. This would require assigning a plurality of ATM permanent virtual circuits to each subscriber, one for each different guaranteed level of quality of service and one for all other Internet traffic for the subscriber. Administration and provisioning of one virtual circuit per subscriber is already complicated, and the number of virtual circuits through any given ATM node is limited by current equipment designs. Expanding the number of permanent virtual circuits per subscriber to support multiple QoS tiers of service therefore would be quite expensive, and the management thereof would become a nightmare. To support an increased number of virtual circuits, many having guaranteed QoS requiring some substantial minimum rate at all times, would also require that the operator substantially upgrade the network to increase the end-to-end capacity all the way to the wide area network 132.

Furthermore, to actually receive the desired QoS requires that all elements involved in the communication must guarantee the desired level or quality of service. For communications across the public Internet 132, this means that various nodes and links on the public Internet must be available and capable of providing a guarantee of the desired QoS. In point of fact, few nodes on the public Internet actually support any type of QoS. Hence, even if the ADN supported a desired QoS, most subscribers would not benefit from that service because their communications over the public Internet would have no QoS guarantee, and would suffer from the usual problems of latency and jitter.

Consequently, current deployments of ADSL-based data networks, such as shown in FIGS. 14 and 15 generate many customer complaints. From the customer perspective, the service does not deliver the data rates that the customer pays for on a consistent basis. The customer typically blames such problems on network equipment failure. In fact, most of the problems already are due to virtual circuit congestion problems, of the kinds outlined above. Essentially, the ADN network is crippled by the unpredictable nature of the service levels that the customers perceive due to congestion on the ADN and on the public Internet.

Also, with this approach, because all of the major service elements are implemented in servers accessible to the Internet, all of the services are subject to severe security risks. Each service provider's server is accessible to virtually any computer coupled for communication via the Internet. This openness is a desirable feature of the public Internet. However, a consequence is that any such server is accessible to and thus subject to attack from any hacker having Internet communications capabilities. Popular services, particularly those generating substantial revenues, become prime targets for attack.

Another area of problems is that the ADN does not offer the carrier any technique for offering its own differentiated service applications. To compete with other service providers, the carrier operating the ADSL-based data network needs to introduce its own multimedia services, for example, its own video services to compete with video services of cable television companies (that offer competing Internet access services). As noted above, however, introduction of a new service, such as true video on demand or broadcast video requires communications via the public Internet 132. This is true even if the carrier operating the network of FIGS. 14 and 15 wanted to initiate its own video service(s).

Hence, there is an ongoing need to improve the architecture and operation of a digital subscriber line data communication network, particularly to facilitate finer gradation of services within the local network. The need, first, is for such a local network to support introduction of services on a 'vertical' basis within the local access network separate and apart from the common forms of Internet traffic, both for commercial differentiation and for increased security. In a related need, the local network needs to support a number of different levels of quality of service (QoS). There also exists a need for upstream traffic to be shaped by customer equipment located at or near the interface between a customer's network and the ADN according to traffic destinations. A similar need also exists for such customer equipment to prioritize and queue the upstream traffic according to QoS metrics mirroring those of the ADN.

SUMMARY OF THE INVENTION

A general objective of the invention is to implement an enhanced digital communication network for subscriber lines that supports vertical introduction of new communication and/or multimedia services.

A further objective is to support multiple levels or grades of quality of service within the access network.

Another objective of the invention relates to improvement of the cost effectiveness of the data network, for example, by reducing the demand for high-capacity interoffice links while increasing the bandwidth available at the network edge for at least some types of services.

A related objective is to provide a technique for introduction of new high-end services near the network edge, from a domain that is more secure and therefore less subject to hacker attacks.

A further objective of the invention is to support QoS and/or local introduction of vertical services, without the need to assign multiple virtual circuits or the like to each subscriber.

Still further objectives of the invention relate to provisioning of service through an access data network. Specifically, it is an objective of the provisioning related concepts to significantly reduce, or completely remove, the errors present in the existing data circuit provisioning process, which includes: manual ordering processes; manual record-keeping; and manual circuit changes at the PSTN frame and the intermediate ADSL frame.

A further objective of the invention is to support customer premises data equipment that have conventional protocol stacks without the need for additional or proprietary shim software in each user device.

A related objective is to support a plurality of different customer premises data equipment that each include a network stack implementing a common communications protocol.

Another objective of the invention is to provide a single logical communications session which multiplexes multiple actual sessions between a customer data equipment and other devices on a local access network or the Internet. A related objective is multiplexing multiple sessions from various customer premises data equipment over a single logical communications session.

A further objective of the invention is to alter data frames received from customer premises data equipment according to the destination network domain of the payload of that data frame and to forward the altered data frame to the ADN.

Another objective of the invention is to enforce access control lists that prevent certain sessions from being established or used between particular customer premises data equipment and particular network destinations.

A further objective of the invention is to support QoS guarantees in the upstream traffic received from customer premises data equipment and forwarded to the ADN.

The preferred embodiments of the invention alleviate many of the above noted problems by providing an intermediate node, typically an enhanced switch, to segregate upstream traffic based on analysis of the type of communication. This analysis utilizes protocol information contained in each communication, for a protocol higher than the switching protocol, that is to say higher than a protocol used to define the customer's logical circuit. In an implementation utilizing ATM, for example, the logical circuit is a virtual circuit, and the node examines the protocol information for layers above the ATM layer. One type of traffic remains on the virtual circuit, whereas other traffic is handed off to a vertical services domain. The node also provides a point to aggregate traffic from the from the vertical services domain with other traffic on the subscriber's logical circuit, for transport to the customer premises equipment.

To this end, the preferred embodiments use an ATM switch having routing/processing capabilities at the higher layer, for example at the layer-3 protocol or above, in close proximity to a DLSAM. The links between the DSLAM and this switch can be of any desired high capacity because they are short and therefore relatively low in cost. Consequently, the DSLAM and the new ATM switch can support relatively high bandwidth from that node to the customer premises. To utilize the increased bandwidth and support new services, the modems on the opposite ends of the digital subscriber line negotiate and operate at the maximum rate that the line conditions will permit.

The ATM switch essentially subdivides the traffic associated with each subscriber line. One branch goes to a gateway router and hence to one or more ISP(s) at the rate corresponding to the Internet access subscription. It may be helpful to consider this as long distance or wide area traffic for the subscriber. The other branch is for local traffic, to and from the locally connected vertical services domain. The interconnection to the vertical services domain supports QoS and introduction of vertical services not easily provided from the public Internet, such as video on demand, multicasting, and voice over IP. The vertical services domain is relatively secure since it is not accessible from the public Internet.

In operation, the access network will still support a logical circuit in the form of a virtual circuit to the gateway router for each customer, for example in the form of an ATM permanent virtual circuit. That circuit is provisioned for the subscriber's desired grade or quality of Internet access service. The subscriber line, however, supports at least the same and often a higher rate service, for example via rate-adaptive ADSL communication over a twisted wire line. In the upstream direction, the ATM switch examines at least one aspect of each data transmission relating to a logically higher level of protocol, e.g. in a layer 2 protocol encapsulated in ATM, or at layer 3, layer 4, or higher. From the higher level information, the switch determines the type of transmission and segregates the upstream transmissions on the subscriber's virtual circuit. One type of transmission continues on the virtual circuit, e.g. for Internet transport. Any and all other types, however, go to the vertical services domain. In the downstream direction, the ATM switch aggregates any communications coming from the vertical services domain together with downstream transmissions on the virtual circuit from the Internet.

The vertical services domain also represents a communication network. The vertical services domain, however, preferably takes the form of a data network optimized for local transport of vertically injected services, that is to say local data traffic. In view of its local nature, it is easier and more cost effective to provide high bandwidth services. The vertical services network, for example, could take the form of a giga-bit Ethernet type local area network. Also, it is easier to adapt the vertical services network to support service level agreements with customers with regard to quality of service. In many cases, it actually is sufficient to support QoS on the one hop through the ATM switch, itself.

To support the QoS requirements, a feature of the preferred embodiments involves certain queuing and tagging operations within the ATM switch. Essentially, the switch will maintain two or more queues for each permanent virtual circuit. The switch distinguishes the queues based on importance. As the switch receives cell transmissions for transport over the virtual circuit to the customer premises, the switch will internally tag each cell as to its importance level and place the cell in the appropriate queue. The switch may implement any one of a number of different algorithms to select and transmit cells from the various queues. The particular algorithm is selected to implement QoS in conformance with the subscriber's service level agreement with the carrier and/or agreements between the carrier and the vertical services providers.

Within the one virtual circuit assigned to the individual subscriber, the invention actually provides multiple tiers of service, preferably with multiple levels of QoS. Also, at different sections along the virtual circuit "pipe," the network provides different levels of rate shaping. All layers and all services are available at the home, but different services receive different treatments in the network conforming to the different levels of QoS. The inventive approach, however, does not require each subscriber to have multiple virtual circuits.

Services provided on the vertical services domain appear as IP data services. Virtually any communication service may utilize the vertical services network and through it to gain access to the carrier's local customer base, simply by providing an IP interface for coupling to the vertical services network. For example, it is a simple matter to connect any digital source of broadcast audio or video information, such as a direct satellite broadcast receiver system similar to those used today in residential applications, through an IP interface. Such a broadcast source and interface can provide the full range of received video services, over the vertical services network. The access data network may distribute the video programming to a number of access switches within a local geographic area. The switch provides an optimum point for frame or cell replication for multicasting services. Hence, in our video example, the switch replicates and distributes frames for the broadcast service over the digital subscriber line circuits to customers desiring to view the programming.

An aspect of the present invention relates to a CPE and associated software and methodologies for separating a protocol stack shim software from the customer devices, or customer premises data equipment, using the network services. According to this aspect of the invention, a CPE is provided that receives data from the devices according to a common encapsulation scheme, determines the encapsulation scheme needed in order for that data to be properly routed in the access network, and then encapsulates the data into the appropriate ethertype frame. Typically, Internet-bound frames are encapsulated using PPPoE so they pass through the VSI switch, while frames destined for the vertical services domain are encapsulated using another ethertype to allow the VSI switch to properly route them. A number of benefits arise from locating the PPPoE software on the CPE, including, for example, increased security control, PPPoE proxy services, and implementation of QoS in the upstream direction.

A further aspect of the invention relates to unique software for implementing, for example, the frame examining, destination determining, frame altering, security enforcing, and QoS prioritizing functions of the CPE. A software product, in accord with this aspect, includes at least one machine readable medium and programming code, carried by that medium. In a preferred embodiment, the code includes several cooperating applications which may reside in separate media within the CPE.

A computer readable medium, as used herein, may be any physical element or carrier wave, which can bear instructions or code for performing a sequence of steps in a machine readable form. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the instructions or code for performing the sequence of steps. Such a carrier wave may be received via a wireline or fiber-optic network, via a modem, or as a radio-frequency or infrared signal, or any other type of signal which a computer or the like may receive and decode.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
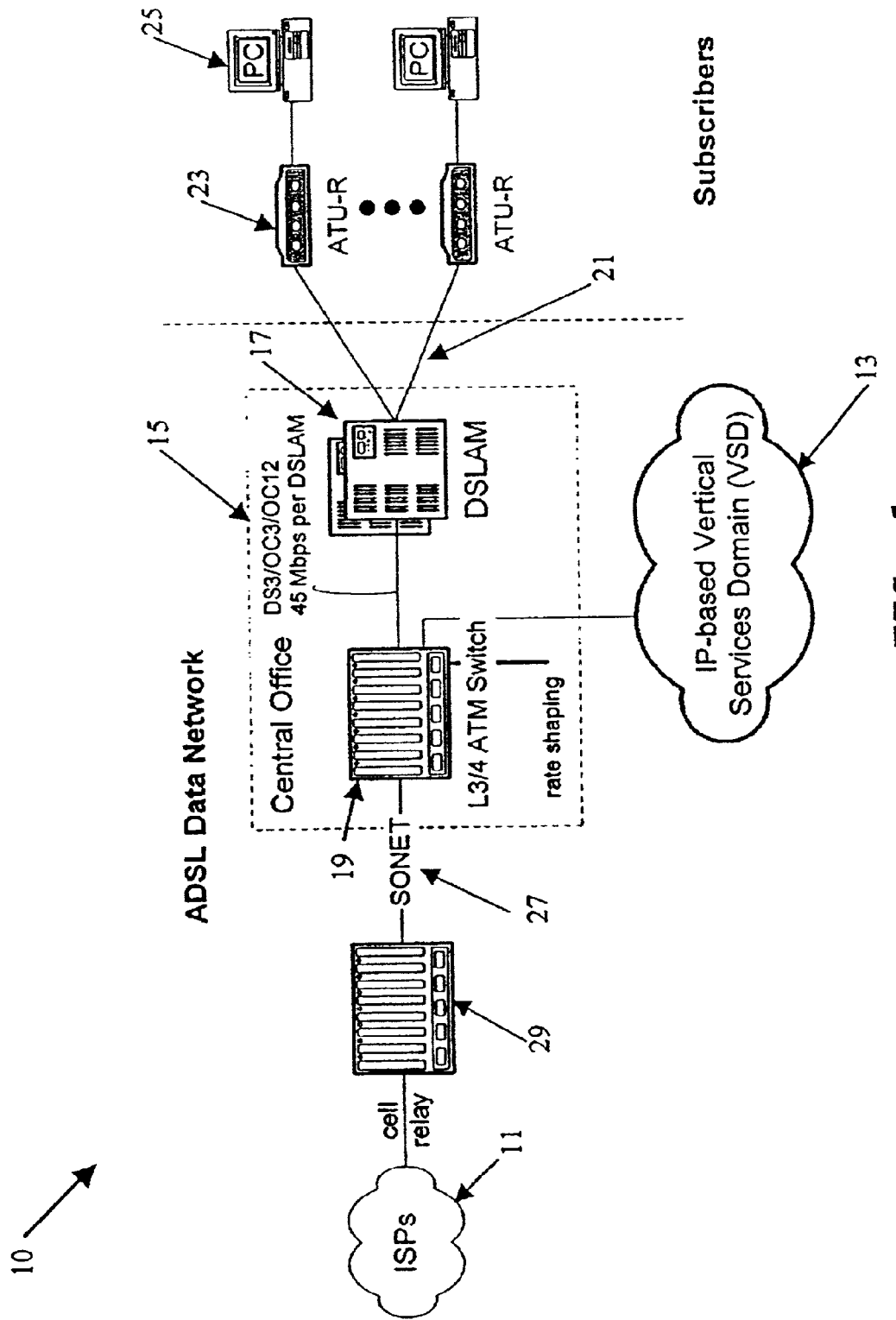
FIG. 1 is a functional block diagram of a digital subscriber line data network supporting enhanced services in accord with the inventive concepts.

The inventive network architecture introduces QoS into the ADN, in a manner that enables the delivery of sophisticated and demanding IP-based services to subscribers. The architecture does not affect existing Internet tiers of service such that the promised rates for such access appear the same as offered today. Also, the new architecture is cost-effective in terms of initial costs, build-out, and ongoing operations. The architecture utilizes an access switch or router capable of examining and selectively forwarding packets based on a relatively higher layer of the protocol stack, that is to say based on information encapsulated within the layer-2 information utilized as the lowest level definition of connectivity through the network. The access switch enables segregation of upstream traffic by communication type and downstream aggregation of wide area traffic together with traffic from a local vertical services domain.

In accord with the invention, the access switch examines the higher-level protocol information in the upstream communications to segregate traffic into two or more streams based on traffic type. A logical circuit provisioned for the subscriber extends from the customer premises through the switch to a node providing service to the packet switched network, typically on the Internet. The provisioning of this circuit defines a contiguous connectivity for the logical circuit, in the layer-2 protocol utilized by the network. Higher level protocols ride within this particular layer-2 protocol, including some protocols that are often considered themselves to be layer-2 protocols.

The analysis of upstream packets to determine higher-level type enables segregation of the upstream traffic into two or more upstream flows. For example, this allows the switch in the preferred embodiment to keep traffic bound for the packet switched internetwork on the logical circuit but route all other traffic onto another network, in this case a local network for vertical services. In the preferred embodiment, from the access switch or router to the packet switched network, the provisioning for the logical circuit limits the rate(s) of communication to those defined by the grade of service to which the customer subscribes. From the customer premises to the switch, however, the communications run at the optimum rates that the facilities can physically support, e.g. the maximum rates that the ADSL modems or the like can adaptively establish for the particular subscriber's line.

In the downstream direction, the switch aggregates traffic for each subscriber. The switch receives the rate-limited traffic from the packet switched network, on the subscriber's logical circuit. The switch also receives any downstream traffic intended for the subscriber, from the vertical services network. The switch combines this traffic and sends the combined communications downstream over the subscriber's logical circuit to the customer premises, at the optimum downstream rate that the subscriber's facilities can support.

The functionality of the customer premises data equipment that formats upstream frames according to a frame's destination within the ADN can be performed by a separate device positioned between the customer premises data equipment and the ADN. The term "separate device" simply means the device is distinct from the customer premises data equipment; however, this device could be a physical part of some other device, for example, the ATU-R. This separate device can segregate traffic into different data types, according to destinations within the ADN, with the upstream switch or router still performing forwarding of the traffic according to its type. This separate device can act as a session proxy and also enforce other traffic rule-sets such as security access control lists and QoS metrics that mirror those of the ADN.

Figure 2:
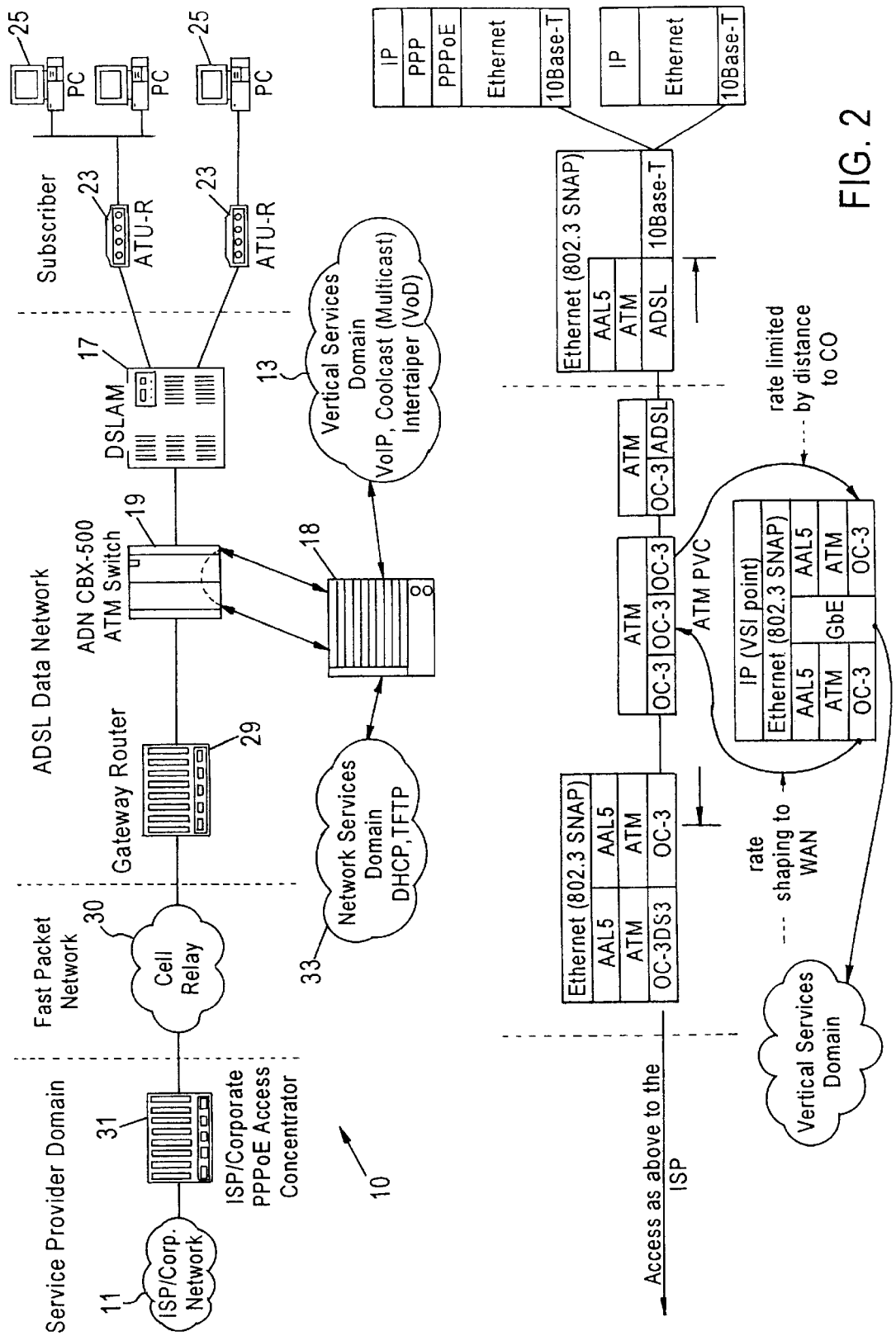
FIG. 2 is a slightly modified functional block diagram of network of FIG. 1, illustrating the protocol stacks used in the various network elements.

FIG. 1 provides a high-level functional illustration of an exemplary digital subscriber line network, specifically an ADSL data network 10, implementing the various concepts of the present invention. FIG. 2 provides an alternative functional illustration of the elements of such a network. Of particular note, FIG. 2 shows the various protocol stacks associated with the appropriate network elements that utilize those stacks. The end-user may be a single PC user or a small business or a residential LAN user. The data equipment of such users typically includes servers and PCs and may include a variety of other devices, such as fax machines, televisions, recorders and remote controlled appliances, having data communication capabilities.

The customer access link comprises an xDSL twisted pair, although those skilled in the art will recognize that the invention is readily adaptable to networks using other types of links to the subscriber premises. In the illustrated embodiment, the network 10 supports ADSL, which the carrier may offer in grades supporting 640 kbps, 1.6 Mbps or 7.1 Mbps (downstream) rates for Internet access. The actual communications over the DSL loops, however, run adaptively at the maximum rates that the line conditions allow.

The ADSL-based local access data network or "ADN" 10 provides access to two different network domains for communication services. The two network domains are logically separate. In most implementations, the first domain may be considered as a long distance or wide area domain, whereas the second domain is a local network domain. In the illustrated example, the ADN 10 provides access to a first domain in the form of a wide area internetwork, such as the public Internet, corporate local area networks (LANs), and the like, represented by the network cloud 11 for the ISPs. The high speeds available through the local network 10 enable a wide range of communications, for example, of text data, of video data, for multimedia, for web browsing, of transfers of files, for database searching, and the like via the network(s) 11.

In accord with the invention, the ADSL-based local access network 10 also offers access to a wide variety of other IP-based services through a local data network 13 serving as the vertical services domain (VSD). The vertical services typically are high-end services requiring certain QoS levels and often having a certain local characteristic. Examples of the vertical services are discussed in more detail later.

The vertical services network offers an efficient domain from which the carrier can locally inject high-end services and/or services of other local providers. Because the vertical services domain is separate from the public Internet, equipment providing the vertical services is subject to attacks directly from the public Internet.

As shown in FIGS. 1 and 2, a central office (CO) 15 comprises one or more DSLAMs 17 and L3/4 ATM switch 19. Elements of the CO 15 providing plain old telephone service (POTS) have been omitted for simplicity of illustration, since they are generally similar to those shown in FIG. 9.

The switch 19 is designated as an "L3/4" switch here as a matter of convenience, to illustrate that the switch 19 has the capability to make selective packet forwarding decisions based on protocol information at some level that is above the L2 level that the switch normally utilizes to define or establish logical circuit connectivity. It will be recognized, however, that some of the protocols, although higher than the ATM type level 2 protocol used by the preferred switch are themselves often thought of as level 2 protocols even though they are above or encapsulated in the ATM type level 2 information. Also, decisions as to the selective forwarding may be made in response to monitoring of any level of the protocol stack above the L2 level that the switch normally utilizes to define or establish logical circuit connectivity, for example from any level above ATM all the way up to the L7 application layer.

Returning to the discussion of FIGS. 1 and 2, for purposes of this discussion, assume that the equipment at the various customer premises connect directly to the CO 15 via twisted pair type copper wiring 21. In an actual implementation, many customers may connect through such wiring to a remote terminal linked to the CO 15 via optical fiber. Other hardwired, optical or wireless implementations of the digital subscriber lines are discussed later. In the illustrated embodiment, each line 21 from a customer premises connects to an ATU-C within one of the DSLAMs 17.

On the customer premises side, the digital subscriber line circuit 21 connects to an ADSL terminal unit (remote) or ATU-R 23. The ATU-R 23 is a modulator/demodulator (modem) for communicating over a twisted wire pair type line 21, in accord with the ADSL protocols. The ATU-R in turn connects to customer premises equipment, shown by way of example as a PC 25 at each location (FIGS. 1 and 2). Those skilled in the art will recognize that the customer premises equipment 25 may include a wide range of other types of devices having data communications capabilities (see e.g., FIG. 3).

The ADSL user's normal telephone equipment (not shown) also connects to the line 21, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Such modems may implement either one of two techniques for dividing the usable bandwidth of the telephone line to provide these channels. One approach is to divide the usable bandwidth of a twisted wire pair telephone line by frequency, that is to say by Frequency Division Multiplexing (FDM). The other approach uses Echo Cancellation. FDM uses one frequency band for upstream data and another frequency band for downstream data. The downstream path is then divided by time division multiplexing signals into one or more high-speed channels and one or more low speed channels. The upstream path also may be time-division multiplexed into corresponding low speed channels. With echo Cancellation, the upstream band and downstream band substantially over-lap. The modems separate the upstream and downstream signals by means of local echo cancellors, in a manner similar to that used in V.32 and V.34 modems.

The DSL modems may use a number of different modulation techniques to physically transport digital data streams. A number of implementations of the modems have used carrierless amplitude phase (CAP) modulation. Most current xDSL modems, however, utilize a discrete multi-tone (DMT) approach.

Figure 9:
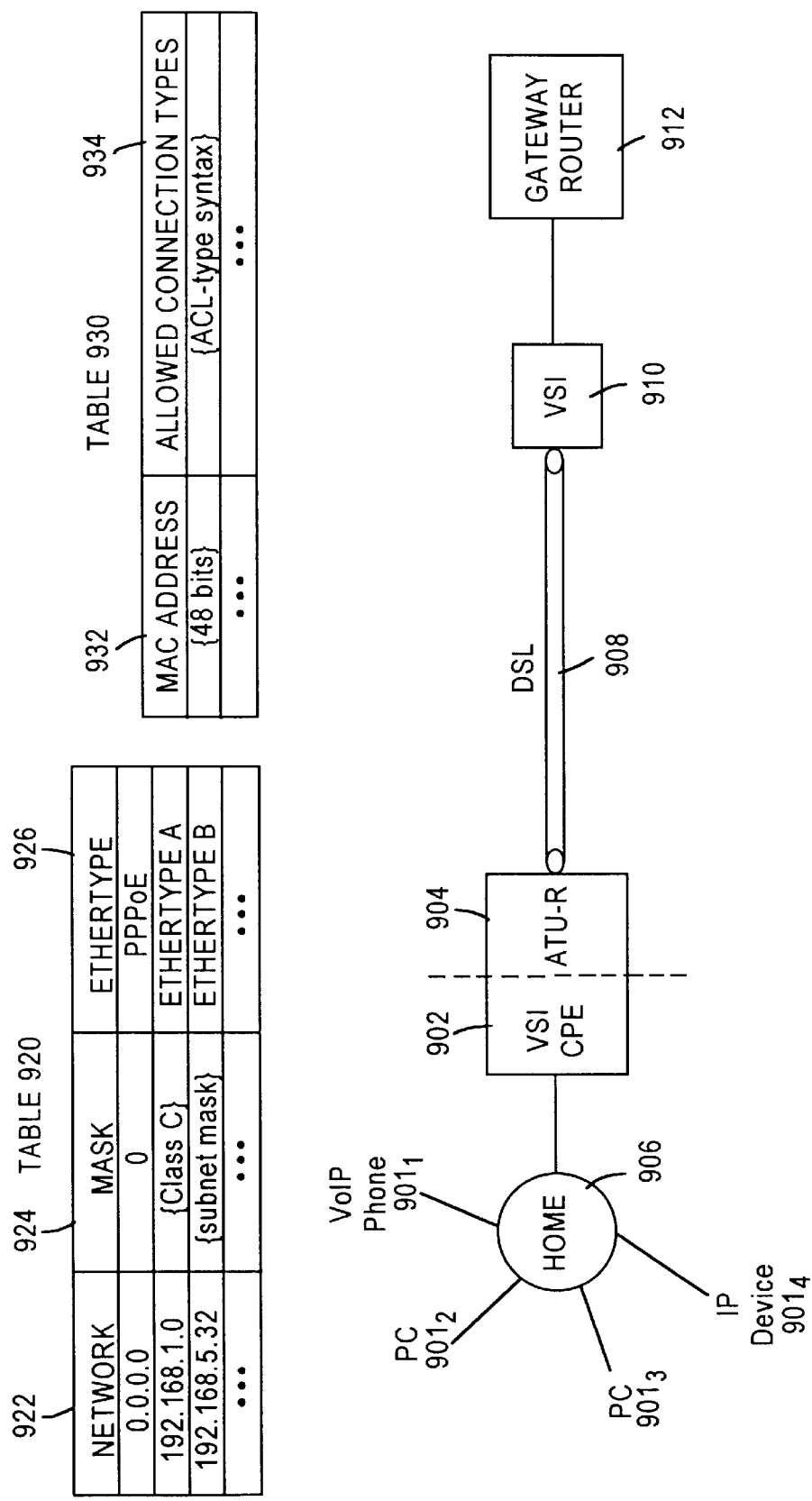
FIG. 9 is a simplified diagram of the network of FIGS. 1 and 2 but showing customer premises equipment (CPE) according to an alternative embodiment of the present invention.

Returning to the discussion of the CO 11, the structure and operation of each DSLAM 17 is essentially the same as those of the DSLAM 111 in the embodiment of FIG. 9, except that the control functionality of the DSLAM 17 is somewhat different. The DSLAM 17 controls the ATU-Cs to implement a rate-adaptive ADSL service, to adapt operations so as to maximize data rates for the communications over the individual subscriber lines. Essentially, the ATU-Cs and ATU-Rs signal each other over the lines to synchronize their modes of operation at parameter settings, which achieve optimum data throughput. Also, the DSLAM 17 does not need to monitor or limit the line rates, but instead relies on the rate-adaptive control algorithm to maximize the rates achieved over the ADSL circuits or provide rate-shaping for the ATM virtual circuits. Other network elements limit rates, where necessary.

The L3/4 ATM switch 19 is co-located with the DSLAMs 17, within one central office 15. As a result, it is practical to connect the multiplexer within each of the DSLAMs 17 over a high-speed data link directly to an appropriate port of the ATM switch 19. Because these links are short, there is little or no cost imposed when implementing such links using wideband equipment. By itself, the co-location of the L3/4 ATM switch 19 with the DSLAM(s) 17 does not increase bandwidth. Rather, it makes increased bandwidth at the network edge economically feasible, due to proximity. Co-location removes the requirement to purchase expensive wide area transport (the SONET ring) to increase bandwidth. In particular, the direct OC3/OC12 connections between the DSLAM 17 and the L3/4 ATM switch 19 do not incur any recurring tariff expenses.

The ATM switch 19 connects through a SONET ring 27 to a gateway router 29 providing ATM transport through a cell relay network 30 (FIG. 2) to the ISPs shown at network 11 in the drawings. Most of the ISPs will utilize a concentrator or other equipment as their point of presence for Internet access (FIG. 2). In the preferred embodiment, the equipment 31 provides a point-to-point protocol (PPP) interface designed for transport over Ethernet (PPPoE). The ATM switch 19 also provides a connection to the local implementation of the VSD network 13, for example via a giga-bit Ethernet port to a switch or other local network elements 18.

The illustrated local access type ADN network 10 provides ATM cell transport from the customer premises to the ISP network(s) 11. The ATM cells serve as the layer-2 protocol for defining contiguous switched connectivity. Higher level routing protocols, such as Ethernet and TCP/IP frames, ride within the ATM cells. Services of different types utilize different protocols at one or more layers above the ATM cell layer. In the preferred embodiments, all communications utilize Ethernet. However, communications to and from the ISPs use the noted PPPoE type Ethernet protocol. In contrast, communications to and from the vertical services domain use one or more of the other Ethertype protocols.

To efficiently provide cell relay, each customer is assigned a virtual circuit that extends from the ATU-R 23 in the respective customer premises to the gateway router 29. This logical circuit is defined at the layer-2 protocol level. The present implementations implement this logical communication circuit as an ATM permanent virtual circuit, although the inventive concepts may apply to other types of logical circuits or channels.

The gateway router 29 is the communication node of the access network 10 providing access to the wide area IP packet networks, of corporations or more often of Internet Service providers. The gateway router 29 terminates permanent virtual circuits through the cell relay network 30, from the equipment 31 of each such wide area packet network provider 11. The gateway router 29 also terminates the permanent virtual circuits from the subscribers through the data network 10. For communication with a selected ISP network 11, for example, the gateway router 29 routes cells from the permanent virtual circuit from the subscriber through to the permanent virtual circuit of the selected ISP network 11. In the opposite direction, the gateway router 29 routes cells from the permanent virtual circuit from the selected ISP network 11 through to the permanent virtual circuit of the particular subscriber.

For the leg of the subscriber's logical circuit, extending from the L3/4 ATM switch 19 through the gateway router 29, the carrier programs one or more nodes along the path behind the DSLAMs 17, to regulate traffic on the virtual circuit to the rate corresponding to the grade of Internet access service to which the particular customer subscribes. In the preferred embodiment, at least one such node performing this rate shaping function is the L3/4 ATM switch 19. All traffic going to and from the ISP network(s) 11 therefore is still limited to the rates defined in the service level agreement (SLA) for Internet access that the carrier has with the particular customer.

The portion of the virtual circuit extending between the ATM switch 19 and the ATU-R 23, however, is not rate limited but instead runs at the maximum rate that the line will support using the rate-adaptive ADSL modem operation. In most cases, the rate-adaptive ADSL modem operation will support rates substantially higher than the subscription rate for Internet access service.

The L3/4 ATM switch 19 also provides the interconnection to the subscriber's virtual circuit for insertion of downstream traffic from the vertical services domain 13 and separation of upstream traffic from the subscriber's virtual circuit going to the vertical services domain 13. In accord with the invention, decisions as to whether upstream traffic is destined for the vertical services domain 13 or should remain on the subscriber's virtual circuit going through the gateway router 29 and the cell relay network 30 to the ISPs 11 is based on an analysis of traffic type. The traffic type analysis relies on protocol information contained in the communications, which relates to layers of the protocol stack that are higher than the layer-2 switching protocol, in this case above the ATM layer.

As shown in FIG. 2, traffic destined for an ISP 11 utilizes a variation of a point to point protocol (PPP) intended to run on top of Ethernet, referred to as PPP over Ethernet or "PPPoE." A 'type' indicator contained within the Ethernet frames identifies the PPPoE protocol. In contrast, traffic going to and from the vertical services domain utilizes other 'types' of Ethernet protocol. All traffic to and from the customer premises uses Ethernet frames carried within ATM cells.

The switch 19 therefore routes a subscriber's traffic going to and from an ISP 11, upon detection of the PPPoE indicator in the level 3 data contained within the Ethernet cells. This traffic will also utilize public IP addressing. In contrast, the ATM switch 19 routes a subscriber's traffic going to and from the vertical services domain, upon detection of any other type of Ethernet protocol at level 3 or above in the protocol stack. The IP addressing in the vertical services domain 13 utilizes private-IP addresses, for example, as administered with a DHCP server (not shown) coupled to the network cloud 33. Although shown separately, the cloud 33 may be implemented as a portion of the network providing the physical elements of the vertical services domain. The portion 33, however, would typically be a logically separate domain that the carrier controls and restricts for its own network administration use.

Figure 3:
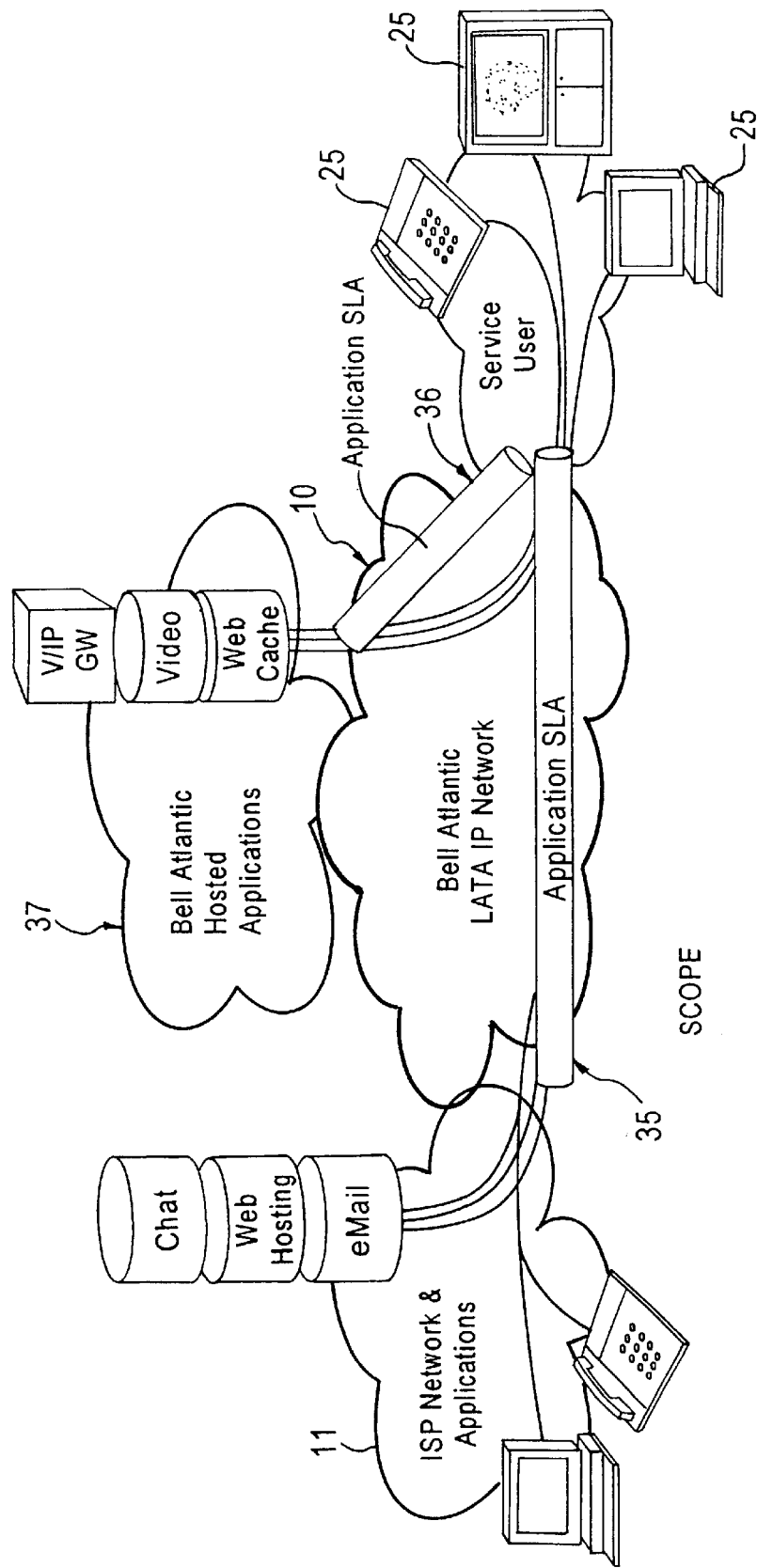
FIG. 3 is a functional block diagram of the network showing the service level agreements (SLAs) for which the network provides appropriate QoS.

FIG. 3 depicts the logical division of the subscriber's traffic, as implemented at the ATM switch 19 in accord with the invention. As shown, the network 10 provides a logical "pipe" or circuit 35 extending to the networks 11 of one or more of the ISPs, for an Internet access application. The ATM switch 19 (FIG. 1) preferably performs a rate shaping or control function. The leg 35 of the subscriber's traffic extending to the ISP 11 provides upstream and downstream communication rates conforming to a service level agreement (SLA) applicable to the subscriber's Internet access application. As such, the communications over the subscriber's logical circuit, extending from the switch to the ISP, provide a first level of QoS. To the subscriber, service over the leg 35 appears the same as a subscriber selected grade of Internet access service as provided by older ADN architectures. FIG. 3 illustrates chat rooms, web surfing and e-mail as examples of services an ISP might offer through the Internet Application SLA circuit 35 and the attendant portion of the subscriber's assigned logical circuit through the access network.

The network 10 also supports communications over one or more logical application paths 36 to local applications 37 hosted in the vertical services domain. Assuming that a subscriber with various equipment 25 also subscribes or otherwise participates in one or more of the vertical services, the local carrier (e.g. Bell Atlantic in FIG. 3) offers a corresponding number of additional application SLAs with the customer. Each SLA for a vertical service may specify QoS parameters for the particular application, such as rate/bandwidth, latency, jitter, packet loss, packet sequence, security and/or availability. Examples of such applications hosted in the carrier's vertical services domain 37 include the illustrated voice over IP service shown as a V/IP gateway, as well as video services and some caching for high volume local web services. Communications for such applications utilize the one or more paths 36.

The network of FIGS. 1 to 3 also supports closed or private user work groups or virtual local area networks (VLANs). VLANs, for example, may be implemented as a service hosted through the vertical services network 13. All traffic from customer premises belonging to one of the VLANs would include a VLAN Ethertype indicator. Since the frames would not be PPPoE type Ethernet frames, the switch 19 would route the upstream transmission to the vertical services network 13. VLAN frames also carry a VLAN identifier. The nodes of the network 13 transport the packets for the VLAN members only to resources that are members of the identified VLAN. In this manner, the capability exists for creating logical workgroups of users and their shared resources (servers, printers, etc.), that may be physically separated from each other. VLAN groupings can provide privacy and security to their members while enabling "broadcast domains" whereby broadcast traffic is kept logically "inside" the VLAN.

The present invention also supports segregation and aggregation of traffic for three or more domains, based on the higher-level traffic type analysis. An alternative implementation for closed user group services therefore might actually provide a third domain for such services. PPPoE traffic would go to the concentrator equipment 31, as discussed above. The switch 19 would route the upstream transmission frames bearing a VLAN Ethertype indicator to the alternate network serving as the VLAN service domain. That domain would process VLAN communications essentially as done in a normal switched Ethernet type network. Upstream transmissions that bear any other type of Ethertype indicator would go to the vertical services network 13, as in the earlier examples.

A feature of the switch, in accord with the invention, is that it prioritizes traffic for each customer to support QoS for the various services as required by service level agreements (SLAs) between the customer and the carrier. In this regard, one implementation of the L3/4 ATM switch 19 performs queuing and tagging operations in accord with the desired prioritization. The switch will maintain two or more queues for each subscriber's permanent virtual circuit. The switch distinguishes the queues based on importance or priority. As the switch receives cell transmissions for transport over the virtual circuit to the customer premises, the switch will internally tag each cell as to its importance level and place each cell in the appropriate queue based on the tag.

The tagging and prioritization may be based on traffic type or 'Type of Service' (ToS). Table 1 illustrates one example of the possible ToS levels that may be assigned to different communications.

TABLE 1

| Relative Priority | ToS Value | AR Queuing | Customer Traffic Encapsulated TOS | Internal BA Mgmt Traffic Rewritten TOS |
|---|---|---|---|---|
| Critical Management | 0 | WFQ (Control 25%) | | OSPF, SNMP, ICMP, BGP |
| Future | 1 | | | |
| Real Time Interactive | 2 | WFQ (High 40%) | Port numbers identified | |
| IP Application Control | 3 | WFQ (Medium 30%) | ICMP, IGMP, EGP, DNS, H.323 signaling, BGP, SIP, Microsoft Media Player Streaming Media Control, RTSP | IGMP, RADIUS |
| One Way Streaming Media | 4 | | UDP (ports 1024+) | |
| One Way Batch | 5 | | HTTP, HTTPS, SNMP, Telnet | |
| Unknown | 6 | WFQ (Low 5%) | Other | Other |
| Non time sensitive | 7 | | FTP, TFTP, SMTP | |

The access switch 19 will examine the content of each communication and determine an appropriate ToS level, for example in accord with the table above. Based on the ToS level, the switch will add a tag to the cell(s) as part of its internal processing. Using the ToS tags, the switch will place each of the cells for a given subscriber into a corresponding one of a plurality of queues that the switch maintains for the subscriber's traffic.

The switch may implement any one of a number of different queue servicing algorithms to select and transmit cells from the various queues. For example, the switch 19 may implement one of several statistical algorithms, equal queuing, weighted queuing, priority selection from queues, etc. The particular algorithm is selected to implement QoS in conformance with the subscriber's service level agreements (SLAs) with the carrier. In most cases, particularly for service applications from the vertical services domain, the switch 19 will not normally drop any cells or packets. In the rare event that the switch 19 becomes congested, any dropping of cells is based on the priority level assigned to the frame, i.e., lowest priority first. Also, if the switch ever drops cells, it drops all cells for an effected lowest priority frame from the relevant queue.

The ability to prioritize traffic across the inserted streams and the PPPoE stream enables the operator to control flows through the ADN 10 so that the local access facility is not overwhelmed with content which exceeds its physical (rate adaptive) limitations. For example, the queuing rules preferably ensure that the 'proper' applications (based on insertion device based rules) obtain access to the limited rate adaptive bandwidth available on any given subscriber's line. Also, the insertion point, switch 19, will usually sit behind the media conversion point (e.g., the DSLAM 17). An OC3 or other facility between the switch 19 and the DSLAM 17 also could become congested. Preferably, the switch 19 or other element at the insertion point queues the traffic in such a manner that no downstream facility (OC3) limitations (which are independent of the rate adaptive DSL loop limitations) will result in packets being dropped.

The queuing will be done based on customer and network provider determined rules so that contention for the facilities facing the subscriber will be addressed via the dropping of the appropriate packets. That way an inserted video stream doesn't overwhelm a PPPoE or Voice stream (due to facility limitations). Among others, appropriate industry understood methods for accomplishing this queuing control include Weighted Fair Queuing (WFQ), Priority (PQ) Queuing, and Weighted Random Early Discard (WRED).

Also, the ability of the switch 19 to examine higher level information provides other advantages in network operations. For example, the switch can implement sophisticated filters on the higher level information, e.g., to provide security. As another example, the switch preferably performs measuring and monitoring to determine what if any packets get dropped (based on the physical rate adaptive limitations), and generates appropriate reports to an external operations system (not shown).

The introduction of the L3/4 ATM switch 19 in proximity to the DSLAM(s) 17 also provides benefits in terms of operation of the gateway router 29. Due to the end-to-end use of the Unspecified Bit Rate (UBR) PVCs, the gateway router interface to the cell relay network 30 has been engineered to support a maximum of 2000–4000 PVCs (end users). This is essentially an over-provisioning of bandwidth that probabilistically avoids service degradation that could result from simultaneous demand for bandwidth. The ability of the L3/4 ATM switch 19 to perform QoS and rate shaping essentially reduces or ever removes this concern, because it significantly reduces the risk that the gateway router 29 will become a bottleneck. As a result, the ADN 10 can increase bandwidth efficiencies for this interface. Further, the capacity through the gateway router 29 need not be upgraded as often to support demand for increased bandwidth associated with new bandwidth-intensive services, since many such services are now introduced through the vertical services domain 13 and the L3/4 ATM switch 19.

Figure 4:
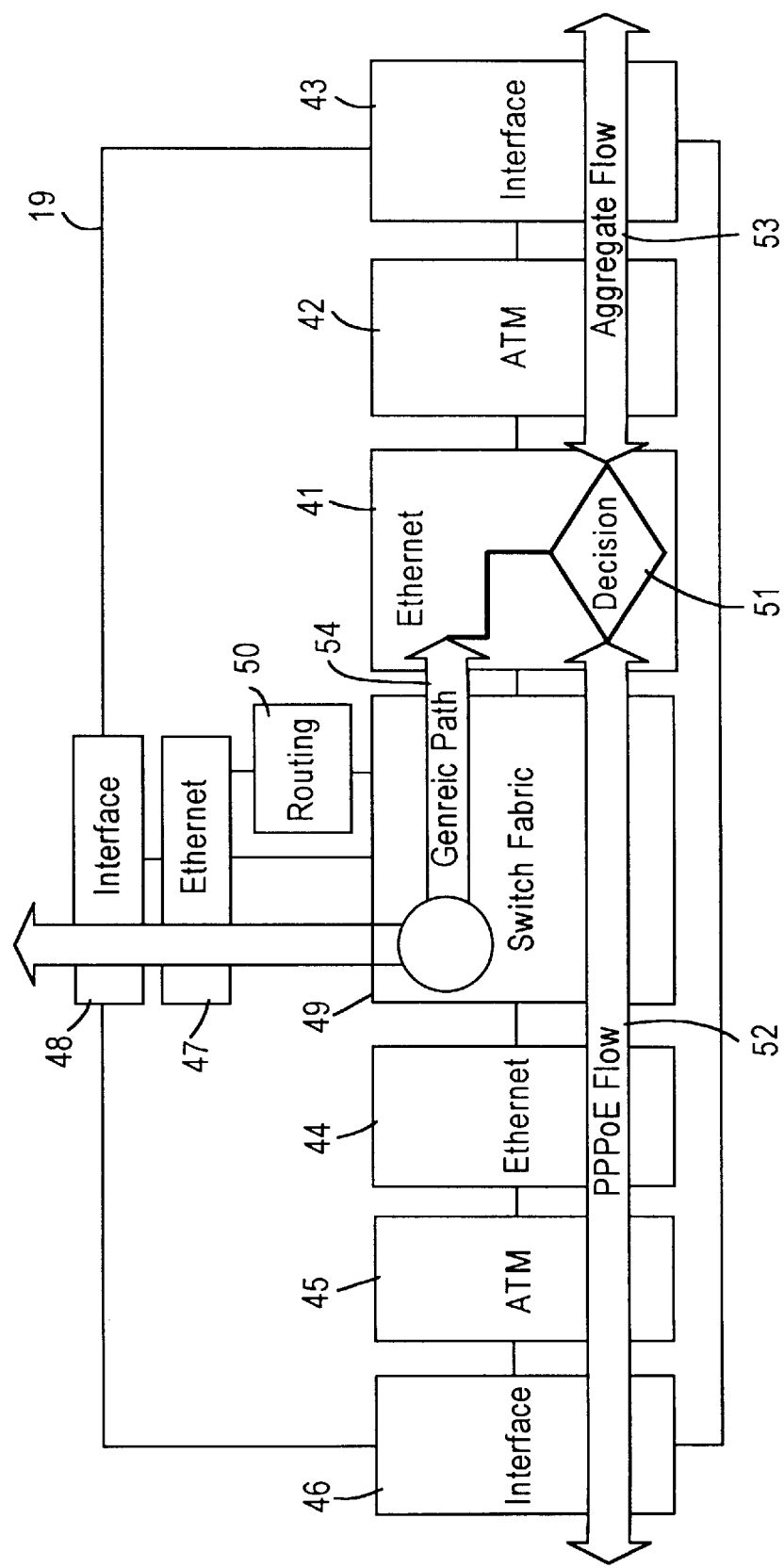
FIG. 4 is a logical diagram of the functional elements of an L3/4 switch, for use in the inventive network of FIGS. 1–3.

To fully understand an exemplary implementation of the various inventive concepts, it may be helpful to consider an ATM-based embodiment of the L3/4 switch 19. FIG. 4 is a block diagram of the elements and functions of such a preferred embodiment of the switch 19.

The preferred embodiments utilize Ethernet framing. As shown in the drawing, the switch 19 includes an Ethernet interface 41, an ATM interface 42 and an associated physical interface 43 facing toward the subscribers. In an embodiment for use in the network of FIGS. 1 and 2, the physical interface might take the form of one or more OC-3 or OC-12 links to the DSLAMs 17. These links carry all ATM cell traffic going to and from the DSLAMs and hence to and from the customer equipment served through the particular switch 19.

The switch 19 also includes an Ethernet interface 44, an ATM interface 45 and associated physical interface 46 facing toward the gateway router 29 and hence the ISPs 11. The physical interface 46 might take the form of one or more OC-12 or OC-48 links to the gateway router 29. These links carry all ATM cell traffic going to and from the ISPs or other wide area inter-networks 11. For these communications, the Ethernet interface 44 passes through PPPoE traffic, as specified by the Ethertype indicator in the cells transporting the relevant frame segments.

Facing the vertical services domain, the switch 19 includes an Ethernet interface 47 and a physical interface 48. These interfaces conform to the particular network utilized by the carrier for the vertical services domain, such as giga-bit Ethernet over wire or optical links.

The switch fabric 49 performs the physical switching of data along various paths through the switch 19, in response to instructions from a programmed routing controller 50. FIG. 4 also shows the communications flow through the switch, for each subscriber. The switch 19 also implements a Decision Point 51, shown for example within the Ethernet interface processing 41 on the subscriber facing side. At that point, the PPPoE traffic is separated from all other traffic. From that point, the PPPoE Flow 52 for each subscriber extends as a portion of the subscriber's ATM virtual circuit, facing the cell relay network and hence the ISPs 11. The PPPoE Flow 52 contains Ethernet frames that are of PPPoE Ethertype. Facing towards the subscriber premises, the switch 19 implements an Aggregate Flow path 53, in the form of another portion of the ATM virtual circuit, which contains all ingress/egress subscriber traffic. The switch implements a Generic Path 54 extending through the interfaces to the vertical services network. This path 54 carries all traffic other than PPPoE.

In this example, the switch 19 implements the Decision Point 51 based on recognition of the Ethertype indicator, which is above the layer-2 ATM cell routing information. However, the switch may implement the Decision Point 51 based on still higher-level protocol information. Also, those skilled in the art will recognize that the concepts of the present invention are applicable in networks using different protocol stacks, for example, based on native IP.

In a preferred embodiment, the Ethernet and ATM interfaces 41 and 42 and the Ethernet and ATM interfaces 44 and 45 implement segmentation and reassemble (SAR) functions, essentially providing two-way conversions between ATM cell format and Ethernet frame format. Segmentation involves dividing an Ethernet frame into a number of 48-byte blocks and adding ATM headers to the blocks to form a corresponding number of ATM cells. Any blocks that do not include a complete 48-byte payload are padded as necessary. Reassembly entails receiving and buffering ATM cells until it is recognized that a complete frame has been received. The ATM headers of the cells and any padding are stripped, and the payload data is reassembled into the form of an Ethernet frame.

In such an embodiment of the switch 19, the decision point 51 determines how to selectively forward the Ethernet frame information taken from a particular series of upstream ATM cells based on the Ethernet information taken from the ATM cell payloads, for example, by examining the frame header and recognizing the particular Ethertype indicator. Internally, the actual switch fabric 49 for such an embodiment of the switch 19 would comprise an Ethernet switch, even though to other elements of the ADN network 10 the switch 19 appears to perform an ATM switching function.

Those skilled in the art will recognize however, that the decision and switch fabric may be implemented in other ways. For example, a series of cells corresponding to an Ethernet frame could be buffered and the payloads examined just to recognize and identify the Ethertype indicator, without a complete reassemble of the Ethernet frame. This later implementation therefore could utilize an ATM cell-based switch fabric.

From the discussion above, it should already be apparent that certain aspects of the invention relate to setting up logical communication circuits at a relatively low protocol layer corresponding to switching or routing functions and then segregating traffic by distinguishing communication type using higher level protocol information. To insure full understanding on these points, it may be helpful to consider the protocol layer definitions, with particular reference to the illustration of the preferred layers in FIG. 2. The International Standards Organization (ISO) Open Systems Interconnection (OSI) reference model specifies a hierarchy of protocol layers and defines the function of each layer in the network.

The lowest layer defined by the OSI model is the physical layer (L1). This layer provides transmission of raw data bits over the physical communication channel through the particular network. For example, on the subscriber lines in the preferred embodiment, the physical layer (L1) uses ADSL. Within the customer premises, communications use an Ethernet physical layer (L1), such as 10Base-T. Upstream network elements may use DS3 at some points, but most use SONET, for example OC-3 or OC-12 physical layer transport. Attention is directed to the lower half of the diagram in FIG. 2, which depicts the various protocol stacks throughout the network 10.

The layer defined by the OSI model next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. In the network 10, the data link layer (L2) is used to define certain switching functions through the network. The network layer (L3) provides capabilities required to control connections between end systems through the network, e.g., set-up and tear-down of connections.

The preferred embodiments utilize ATM cell transport as the lowest element of the data link layer (L2), for example to define the connectivity extending from the ATU-Rs 23 through the ADN network 10 to the ISP or corporate networks 11. Subscriber virtual circuits are provisioned at the ATM cell layer, that is to say at the data link layer (L2). Similarly ISP virtual circuits are provisioned at this ATM data link layer (L2), from the gateway router 29 through the cell relay network 30 to the ISP access concentrators 31. The ATM protocol therefore is the layer-2 (L2) protocol used to define the logical connectivity from the subscriber premises to the gateway router 29. The ATM protocol also is the layer-2 (L2) protocol used to define the logical connectivity from the gateway router 29 to the ISP concentrators 31.

For purposes of this discussion, higher level protocols are protocols that ride on or are encapsulated within the particular layer-2 protocol, that is to say in the payloads of the ATM cells in the preferred embodiment. Such higher level protocols include some protocols, which are often considered themselves to be level-2 protocols, where they are transported within ATM cells. The preferred embodiments use Ethernet, a local area network protocol above the ATM portion of the L2 layer. Technically, the Ethernet protocol may be considered as another L2 layer protocol. However, because it is segmented and encapsulated into the payloads of the ATM cells, the Ethernet protocol information actually is a higher level protocol information above the specific level-2 protocol (ATM) that defines the normal connectivity through the ADN network 10.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

In accord with one inventive concept, the network 10 actually utilizes two or more different types of protocol at levels above the protocol within the L2 layer that actually defines the network connectivity. The ADN network 10 may use different protocols at the higher layers as well. By distinguishing transmissions based on differences in these higher-level protocol types, the ATM switch 19 separately forwards different types of communication traffic for each subscriber. In the preferred embodiment, communications to and from the ISP or corporate networks 11 utilize point-to-point protocol (PPP) as the network layer (L3) protocol and a shim for transport of PPP over Ethernet (PPPoE). PPPoE, as one Ethertype protocol could also be considered as a second layer (L2) protocol albeit above the Ethernet layer itself, which in turn rides on the ATM cells used for routing at least through the permanent virtual circuit at the L2 layer.

In the illustrated implementation, however, the use of the PPPoE or a different protocol actually is an indication of a difference in type of the higher layer protocols. In the illustrated example of FIG. 2, the vertical services domain traffic utilizes Ethernet (802.3 SNAP) above the ATM adaptation layer (AAL). As noted, the presently preferred L3/4 switch 19 implements its routing decision based on recognition of the Ethertype indicator, that is to say to distinguish the PPPoE traffic from all other types of transmission from the customers' data equipment. In view of the use of ATM as the data link layer (L2) protocol of the network defining the lowest layer of network connectivity for communications services through the ADN network 10, the discrimination based on Ethernet actually implements a decision based on an effectively higher protocol layer.

IP protocol carries the actual higher-level applications information, for transport to and from the vertical services domain and for transport to and from the wide area internetwork. As such, IP and its related transport protocol referred to as the "Transmission Control Protocol" (TCP) ride on top of (are actually encapsulated within) the lower level protocol elements discussed above. Presentation and application layer elements ride on top of the IP layer. IP communication requires that each user device have an assigned IP address. IP addresses, however, are a scarce commodity. Because of the use of IP transport for both wide area services and vertical domain services, the network 10 actually may at times assign two different IP addresses to each active data communication device of an end-user, albeit on a temporary basis. The wide area communications and the vertical services network may also be viewed as two separate 'broadcast' domains.

First, the carrier operating the ADSL data network 10 and the vertical services domain network 13 will maintain a pool of local addresses for assignment, on an as-needed basis, to end user equipment 25. To the carrier, the available IP addresses are a limited resource. Accordingly, the carrier assigns IP addresses on a dynamic basis, only to those users actually on-line at any given time. The carrier preferably utilizes private network type IP addresses and dynamically administers such addresses using dynamic host configuration protocol (DHCP). DHCP is a protocol for automatic TCP/IP configuration, which enables dynamic address allocation and management.

When a particular device 25 becomes active via the ATU-R 23 and the DSLAM 17, it will activate a basic protocol stack, including an IP portion enabling communication with a DHCP server. The device will transmit an address request upstream through the network on the subscriber's virtual circuit. At the Ethernet level, this transmission appears as a broadcast message. The L3/4 ATM switch 19, however, will recognize that the packet is not a PPPoE communication and route the cells carrying the packet into the vertical services domain 13. Typically, a DHCP server is coupled to the vertical services domain network 13, for example as part of the carrier's administrative network or systems 33. The DHCP server somewhere on the vertical services domain 13, 33 will answer that broadcast request by selecting and providing an available one of the private IP addresses from the carrier's pool of available addresses. The message with the assigned address will go back to the L3/4 ATM switch 19 for insertion into the virtual circuit and transport back to the requesting device 25.

The particular end-user's device 25 uses the assigned private IP address as its source address, for all of its communications with the vertical services network 13, so long as it remains on-line for the present session. When the overall session ends and the end-user device 25 goes completely off-line, the DHCP server returns the private IP address to its pool of available addresses, for reassignment to another user as the next user comes on-line.

As noted, the user equipment 25 receives a private IP address from the DHCP server. The addresses of services on the vertical services domain also are private IP networks. Because these addresses are private, they are accessible only to equipment within that domain and the data network 10. Consequently, the devices are not accessible to hackers or the like coming in through the public Internet.

This dynamic assignment of IP addresses allows the carrier to limit the number of IP addresses used to the number of users actively connected through the ISP's host to the Internet. The use of private IP addresses allows the user equipment to communicate with the vertical services domain utilizing a normal IP-Ethernet protocol stack.

For the as-desired Internet access service, for example using a PPP or similar protocol, IP addresses are administered through the ISPs. The PPPoE protocol preserves or emulates the traditional dial-up approach to ISP access. However, the PPPoE approach does utilize Ethernet and follows Ethernet standards, for example, involving processing of certain broadcast messages.

The user can select an ISP of choice, and her data equipment 25 will initiate a selective session through the Ethernet layer on the network 10 to access the equipment 31 of the selected ISP network 11, in a manner directly analogous to a dial-up modem call through an ordinary telephone network. Hence at a time after initial activation through the networks 10 and 13, the user may activate a browser or other program for using the wide area internetwork service. This activates a second protocol stack, which includes the PPP protocol and the PPPoE shim. The user selects an ISP, and the data equipment initiates communication through the network 10 to the PPPoE equipment 31 of that ISP.

The IP addresses used by each ISP are public network type IP addresses. To the ISP, the pool of available public IP addresses also is a limited resource. Accordingly, each ISP prefers to assign IP addresses on a dynamic basis, only to those users actually on-line at any given time. Typically, as part of each initial access operation for a PPPoE session, the user's equipment 25 and the PPP terminating equipment 31 of the ISP conduct a handshaking, to establish data communications therebetween. As part of this operation, the user's device transmits a broadcast request for a public IP network. The broadcast message, in PPPoE goes through the virtual circuit to the gateway router 29 and through the router and cell relay network 30 to the ISPs PPPoE equipment 31. Although it is a broadcast message, the network effectively limits transport thereof to the virtual circuit going to the ISPs PPPoE equipment 31, that is to a domain separate from the vertical services network domain 13.

The ISP host equipment 31 initiates a procedure to assign the user's computer 25 a numeric Internet Protocol (IP) address from the pool of available public addresses and sends a PPPoE message containing that address back to the subscriber's device 25. When the session ends and the user goes off-line, the ISP host can reassign the address to another user, as the next user comes on-line.

This dynamic assignment of IP addresses allows the ISP to limit the number of public IP addresses used to the number of users actively connected through the ISP's host to the Internet. The end-user equipment will implement a second protocol stack, carrying PPPoE communications. The PPP protocol will allow the end-user equipment to obtain and utilize the public IP address for communications going to and from the public internetwork.

The switch 19 will limit transport of other types of PPPoE broadcast messages to the link to the PPPoE concentrator 31, in a manner similar to that described above for the PPPoE address request. The switch 19 also limits transport of non-PPPoE broadcast messages to the vertical services domain network 131, both for the address request message and for other types of broadcast requests. As such, the logical circuit to the PPPoE concentrator 31 becomes the conduit to one broadcast domain for upstream PPPoE messages; and the vertical services network 13 defines a second broadcast domain for upstream messages of other Ethertypes.

As noted, the end-user equipment 25 will implement two protocol stacks, a native stack without PPPoE and a second stack with PPPoE and a shim. In actual operation, both the native stack with other Ethernet protocols and the wide area stack with PPP and the PPPoE shim often will be active at the same time. The software in the data equipment 25 will utilize one stack or the other depending on whether the user selected a link, e.g. a URL, relating to the wide area internetwork or the vertical services domain. For example, a browser may display a page with embedded links. If a link is to a service on the vertical services domain, the embedded address will be a private address on the vertical services domain. Selection of such a link causes the device 25 to use the native Ethernet stack (without PPP or PPPoE) and the private address. Hence the L3/4 ATM switch 19 routes the request triggered by selection of the link to the vertical services domain 13. In contrast, if the link is to a service on the public Internet or other network 11, the embedded address will be a public IP address. Selection of such a link causes the end-user device 25 to use the PPP and PPPoE stack and the public address. Hence the L3/4 ATM switch 19 routes the request triggered by selection of the link over the virtual circuits to the PPPoE equipment 31 of the currently selected access provider network 11.

Services provided on the vertical services domain therefore appear as simple IP data services, albeit using the appropriate address space. Virtually any communication service provider may access the vertical services network 13 and through it the carrier's local customer base simply by providing an IP interface for coupling appropriate equipment to the vertical services network. For example, it is a simple matter to connect a direct satellite broadcast receiver system, similar to those used today in residential applications, through an IP interface to provide the full range of received video services over the vertical services network 13. This network may distribute the video programming to a number of L3/4 ATM switches 19, within a local geographic area serviced by the ADN network 10. The L3/4 ATM switch 19 co-located with the DSLAM 17 provides an optimum point for frame or cell replication for multicasting services.

For a multicast service, such as the satellite-originated video broadcast service, the service provider sends one stream through the vertical services domain network 13 to the L3/4 ATM switch 19. The switch 19 will monitor every ATM virtual circuit going to the subscribers, looking for IGNP requests. A subscriber sends an IGNP request to join a selected multicast channel. When the L3/4 ATM switch 19 detects such a request, it identifies the requested channel and the requesting subscriber equipment and forwards a 'join' message to the vertical services domain. Subsequently, the switch 19 replicates received packets for the requested broadcast channel, and the switch drops the replicated packets into the cells for each of the virtual circuits of all of the joined subscribers, including the newly added subscriber. When the subscriber later elects to end viewing of the multicast, the subscriber's equipment sends a 'leave' message, and the switch 19 stops adding the cells for the multicast to that subscriber's virtual circuit.

In addition to vertical services, the carrier continues to provide agreed access services to the equipment of the ISPs, in a manner analogous to current practices. For example, the carrier may provide its Internet access service to a subscriber on a monthly subscription basis, at one of several available rates corresponding to the grade of internet access service (and thus the rate of communication to/from the ISP) selected by the customer's subscription.

In an enhanced service offering, the broadcast provider could offer a convenient navigation interface from a web server. The server could be on the vertical services network, but preferably is on the wide area Internet 11. With a PPPoE session active, the user can surf to the provider's server and view information about available programming. The user might select a current broadcast program by 'clicking' on a URL link in the provider's web-based information. Although provided through the wide area Internet 11, the URL would actually contain the private IP address for the desired broadcast program available from the vertical services network 13. Selection of such a URL therefore would generate a message to the appropriate server on the vertical services network 11 to initiate the above discussed procedure to allow the user to 'join' the selected broadcast. A similar methodology might also enable a provider to offer menu, selection and order/billing services from the Internet 11, to provide pay-per-view or video on-demand type services from the vertical services domain network 13.

Although IP-based, the services from the vertical services domain 13 may follow any other desirable business model. For example, a multicast service provider may contract with the carrier to provide multicast audio (radio-like) and/or video (TV-like) services via the vertical services domain. The multicast service provider, not the subscribers, would pay the carrier. The multicast service provider may offer any or all of the multicast programming to customers on some type pay-per-view basis but would likely offer most of the programming service for free or bundled in as part of some nominal monthly subscription charge. The multicast service provider instead would charge advertisers in a manner analogous to current broadcast business practices. Advertising distributed with the IP multicasting, however, can be carefully targeted at end-customers having demographic profiles meeting specific criteria specified by individual advertisers, which allows the multicast service provider to charge premium advertising rates.

Table 2 summarizes the characteristics and requirements of a number of examples of the types of vertical services that the VSD network 13 can deliver via the L3/4 ATM switch 19 and the ADSL data network 10.

TABLE 2

| Vertical Service Offering | Characteristics of the Service | Network Requirements |
| --- | --- | --- |
| Voice Services | Local Co-Located VoIP Gateways, VoIP, Unified messaging, IP PBX, IP Centrex | Low latency, low jitter, non-correlated packet loss, and high availability |
| Video On Demand (Unicast) | Local VOD Servers or access to centralized servers. | High bandwidth, low jitter, high availability, and low packet loss |

TABLE 2-continued

| Vertical Service Offering | Characteristics of the Service | Network Requirements |
|---|---|---|
| Multimedia Broadcast (Multicast) | Supports whatever model of server deployment/content delivery mechanism. Broadcast Video; Broadcast Audio; Satellite Down Link support; Local Servers at the edge. | Varies with content type and with multicast implementation |
| Caching Services | Local servers at the insertion point, Local delivery mechanism for generic media objects such as web pages, images, video files, audio clips, software downloads, etc. | Layer 3/4 visibility |
| Distance Learning (EVC) | Integrated interactive video, voice and data | Low latency, low jitter, non-correlated packet loss, and high availability |
| Telecommuting | Closed user group with access to Transparent LAN Service (TLS). | IEEE 802.1Q |

Figure 5:
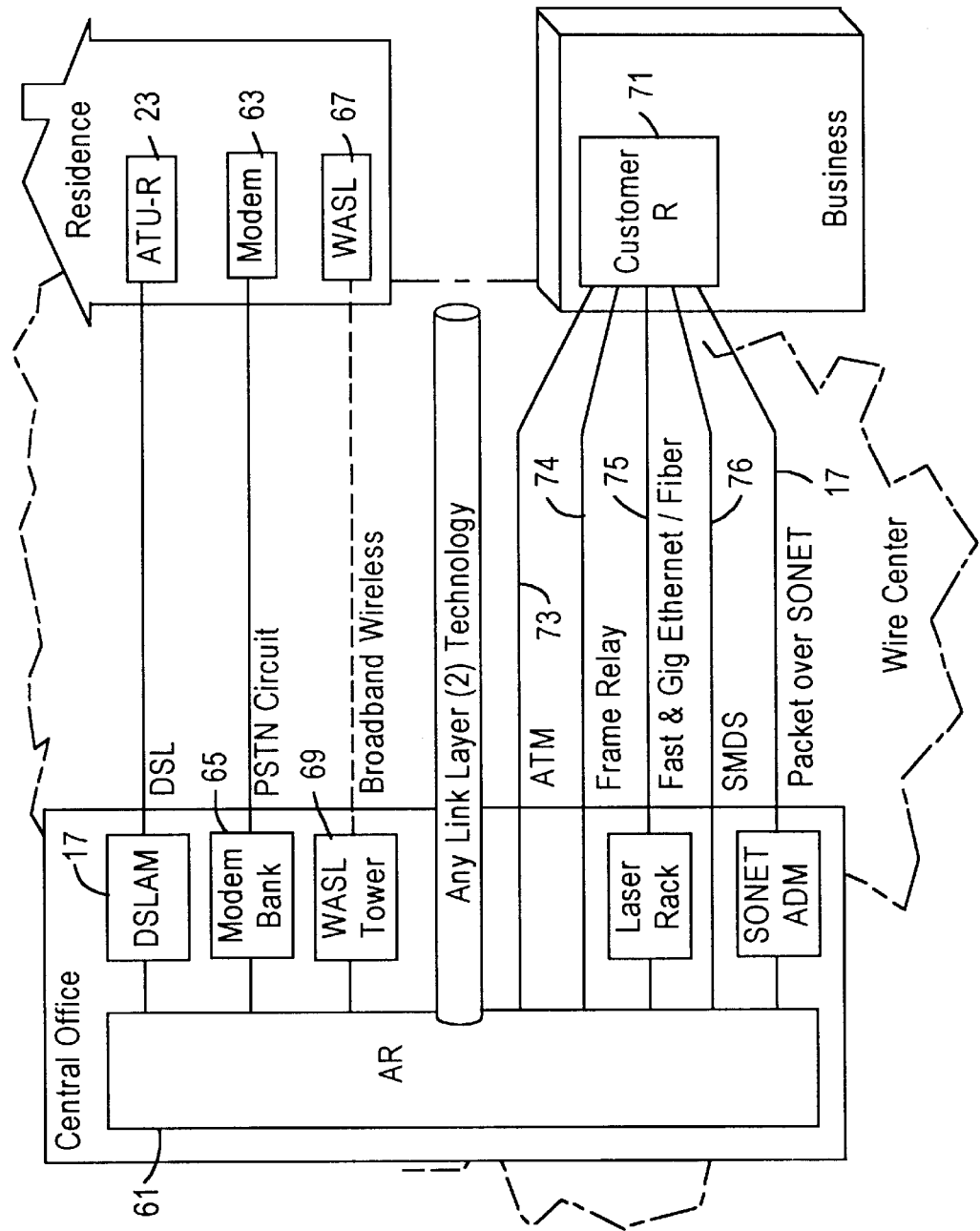
FIG. 5 is a block diagram of a modified portion of the network, useful in explaining migration to other types of physical transport and switching/routing protocols.

The above discussed preferred embodiments implemented the processing above the layer-2 protocol in an enhanced ATM switch and focused on implementation over an xDSL network specifically designed for use of twisted pair wiring to the customer premises. Those skilled in the art, however, will recognize that the principles of the present invention are equally applicable to other types of layer-1 and layer-2 transport/switching technologies as well as selection based on other protocols above the layer-2 connectivity protocol. FIG. 5, illustrates the implementation of the layer 3/4 and higher switch functionality in a generic access router (AR) 61. The illustration also teaches the provision of digital subscriber line data communication between the access router (AR) 61 and a number of customer premises, using a variety of line technologies. The digital line technologies include dial-up modems 63, 65 as well as wireless communications between wireless asymmetrical subscriber loop (WASL) transceivers 67, 69. The access router (AR) 61 can service residential customers via these other communication technologies as well as through the DSLAM 17 and the ATU-R 23 as in the earlier embodiment. The access router (AR) 61 also serves business customer router equipment 71, using a variety of fast frame/cell packet technologies 73–76 and even optical fiber (SONET) 71.

Those skilled in the art will recognize that even these examples are limited. For example, the invention may apply to pure video networks, such as in a hybrid fiber-coax implementation of a CATV system with digital video service as well as cable modem service.

The access router (AR) 61 will provide one or more types of logical circuits, implemented in the appropriate layer-2 protocol(s), e.g. ATM, frame relay, etc. Although the links to the wide area internetwork and the vertical services domain have been omitted here for simplicity of illustration, the access router (AR) 61 will provide the routing functions to and from the wide area internetwork and the vertical services domain in a manner similar to the functionality of the L3/4 ATM switch 19 in the earlier embodiment. In this regard, the access router (AR) 61 will support the QoS levels and will enable local insertion of vertical services.

Figure 6:
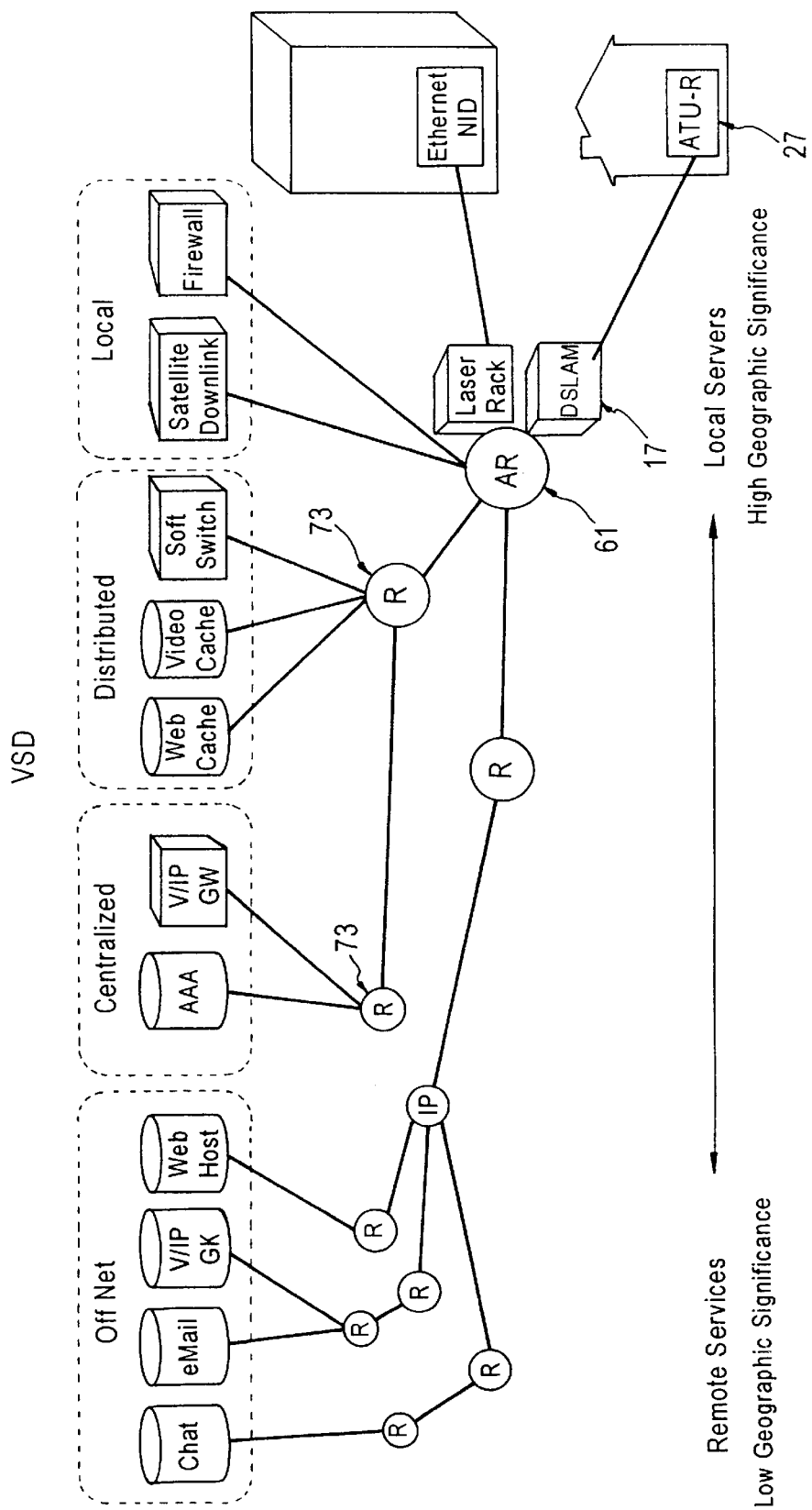
FIG. 6 is a block diagram of a portion of the network of FIG. 5, showing the interconnection thereof with the wide area network and the local vertical services domain.

FIG. 6 depicts a portion of the network of FIG. 5, showing the interconnection thereof with the wide area internetwork and the local vertical services domain. The vertical services network itself may include a number of routers (R) 73. Through that network, the access router (AR) 61 provides communications with services in the VSD that may be purely local, somewhat distributed or even centralized. True long distance data services, such as chat rooms, email and web browsing on the public Internet, however, are considered as Off-Net services, since they are accessed via the Internet access connection under the associated SLA.

Another feature of the present invention relates to a technique for customer-centric selection of telecommunications services and associated automated provisioning of the customer's data network services. The preferred embodiment of this feature of the invention utilizes a correlated information flow, in which the customer's MAC address has a corresponding, temporary IP address and a corresponding virtual circuit identifier (or VPI/VCI). A related aspect of invention encompasses software for implementing the automated provisioning of services through the access data network.

Figure 7:
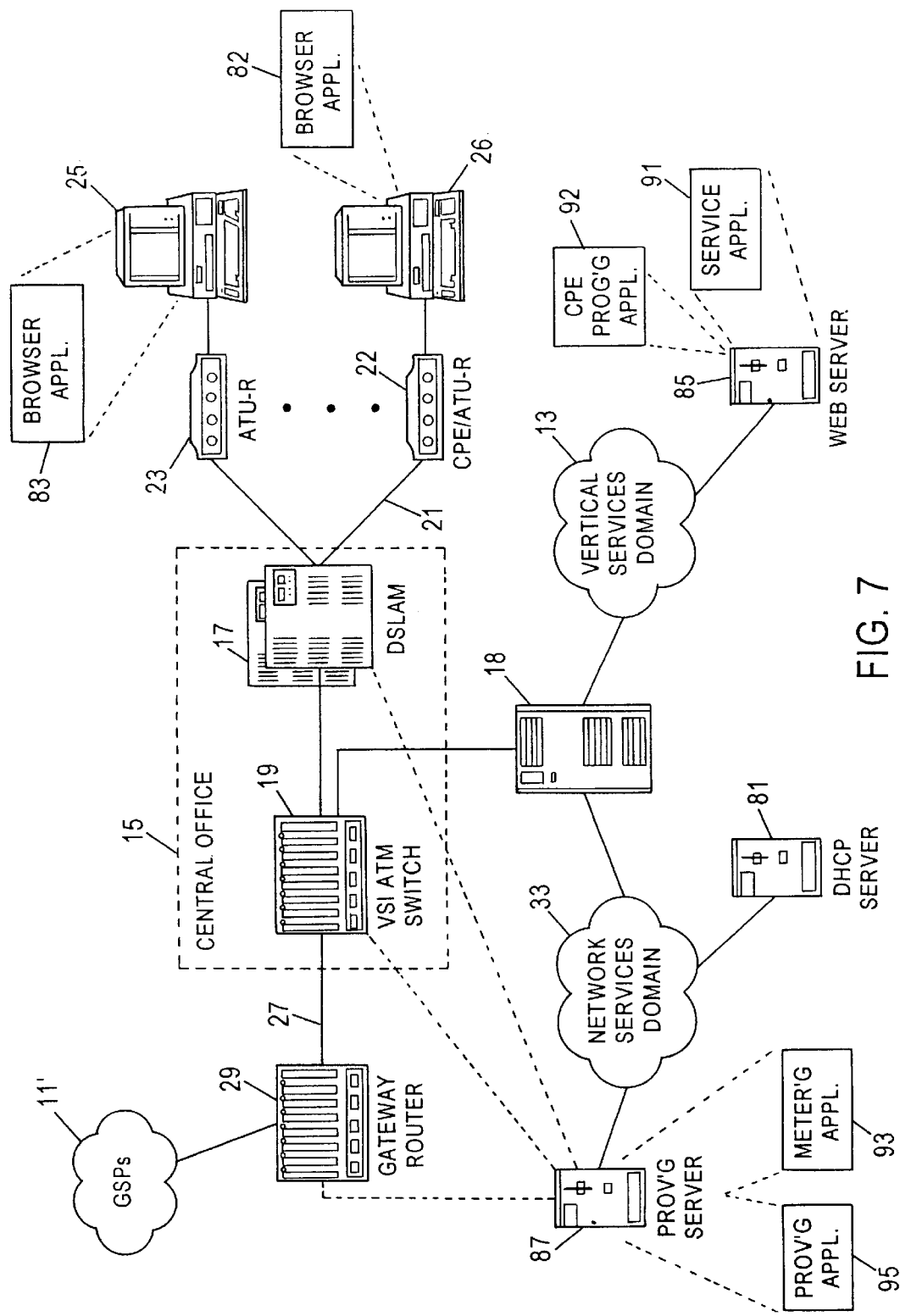
FIG. 7 is a block diagram of the network similar to those of FIGS. 1 and 2, but showing details with regard to certain elements thereof enabling an automated service selection and provisioning procedure in accord with a further aspect of the invention.

FIG. 7 is an enhanced block diagram of the access data network, showing certain additional elements involved in the automated selection and provisioning of customer services. FIG. 7 also is the first of several drawings showing an enhanced CPE device for use with the inventive ADN network. Elements of the network referenced by the same or similar numbers as shown in the earlier drawings are substantially the same as like numbered elements discussed above, for example relative to FIGS. 1 and 2.

The provisioning methodology enables a customer that is capable of receiving vertical services to use a web-based software application to order service. The automated interaction of the user through the common web-based software application causes communications to software entities extant in one or more of the services domains, which coordinate the processes that will automatically provision the corresponding data circuit, according to both customer-selected parameters and detected network parameters. This service selection and provisioning technique significantly reduces, or completely removes, the errors present in the previous data circuit provisioning processes, such as: manual ordering processes; manual record-keeping; and manual circuit changes at the PSTN frame and the intermediate ADSL frame.

The network of FIG. 7 is arranged and provides services essentially as described above, except that certain servers are operated on the Internet or preferably within a privately controlled area or domain of the vertical services networking to enable the customer-selection of telecommunications services and the associated automated provisioning of the customer's data network services. For example, the illustrated embodiment shows a DHCP server 81 within the network services domain 33 (carrier's private portion associated with the vertical services domain through the node 18). The carrier will also operate a web server 85 from the vertical services domain 13, although this server could operate from the public Internet. The carrier also operates one or more provisioning servers 87, for example, via the network services domain 33. The physical network of the vertical services domain 13 and the network services domain 33 may overlap or be substantially the same. The network services domain, for example, may comprise a private virtual network set up for the carrier's own network-operations through the same network as forms the vertical services domain.

The user will run a standard Internet browser application 83, for example on a PC 25 or other appropriate data communication device. The web server 85 and the provisioning server 87 run one or more applications 91, 93 and 95 related to the service selection and provisioning operations, as discussed in more detail below.

Certain communications, discussed layer, may be exchanged between the servers, 81, 85 and 87, for example via the node 18 and physical links of the domains 33 and 13. The provisioning server 87 also communicates with the actual service transport elements of the access data network, such as the DSLAM 17, the switch 19, and the gateway router 29, to conduct a metering operation and/or to activate and control provisioning of services through such elements. The links between the provisioning server 87 and these elements, shown by dot-dash lines in the drawing, may go through secure logical channels through the network services domain 33 and the node 18 or may use other private data communication links.

The preferred embodiment allows the user to select services via a standard web browser interface, that is to say using a browser application 83. The browser application 83 communicates with a Service Application 91. The carrier also utilizes two software modules, a Metering Application 93 and a Provisioning Application 95 in the presently preferred embodiment. The Service Application 91 and the Metering Application 93 may run as one or more programs on the web server 85, the provisioning server 87 or some other server securely maintained by the carrier in one of the vertically inserted domains. For example, the Service Application 91 may run as one or more of the programs on the web server 85; whereas the Metering Application 93 and the Provisioning Application 95 preferably run on one or more provisioning servers 87 in the network services domain 33. Alternatively, the Metering Application 93 could run on one of the actual service transport elements of the access data network, such as the DSLAM 17 or the switch 19.

Also shown in FIG. 7 are a modified CPE/ATU-R 22, a browser application 82 running on the PC 26 connected to the CPE/ATU-R 22, and a CPE programming application 92. According to an embodiment more fully described later, the CPE/ATU-R 22 alters the data frames, if necessary, received from the PC 26 and other user devices at the premises before the data frames are forwarded to the DSLAM 17. The browser application 82 interfaces with an application 92 on the web server 85 to facilitate programming of the CPE/ATU-R 22.

The hardware of a server system, such as the server 85 or the server 87, corresponds to that of a typical general-purpose computer, comprising a central processing unit (CPU) formed for example of one or more microprocessors, a number of memory devices and an interface to the data communication network, in this case to the IP network forming the respective domain 13 or 33. Such a server computer may also provide a local or remote graphical user interface (GUI) for operation and control of the server by carrier personnel. Such an interface, for example, may comprise a common type of display, a keyboard and one or more of the common types of cursor controls. Various media, readable by such a computer system, may store or carry the executable code and any associated data for the respective Application, for example the web pages provided by the server 85 and/or the associated code of the Service Application 91, for the Metering Application 93 or for the Provisioning Application 95. Examples of such media include semiconductor and disk type memories, digital tapes, and the like. Computer readable media used by such systems also include various types of signals sent and received by computer systems for loading software code, associated data and/or web pages into the memory and/or the CPU of the respective server system hardware.

Figure 8B:
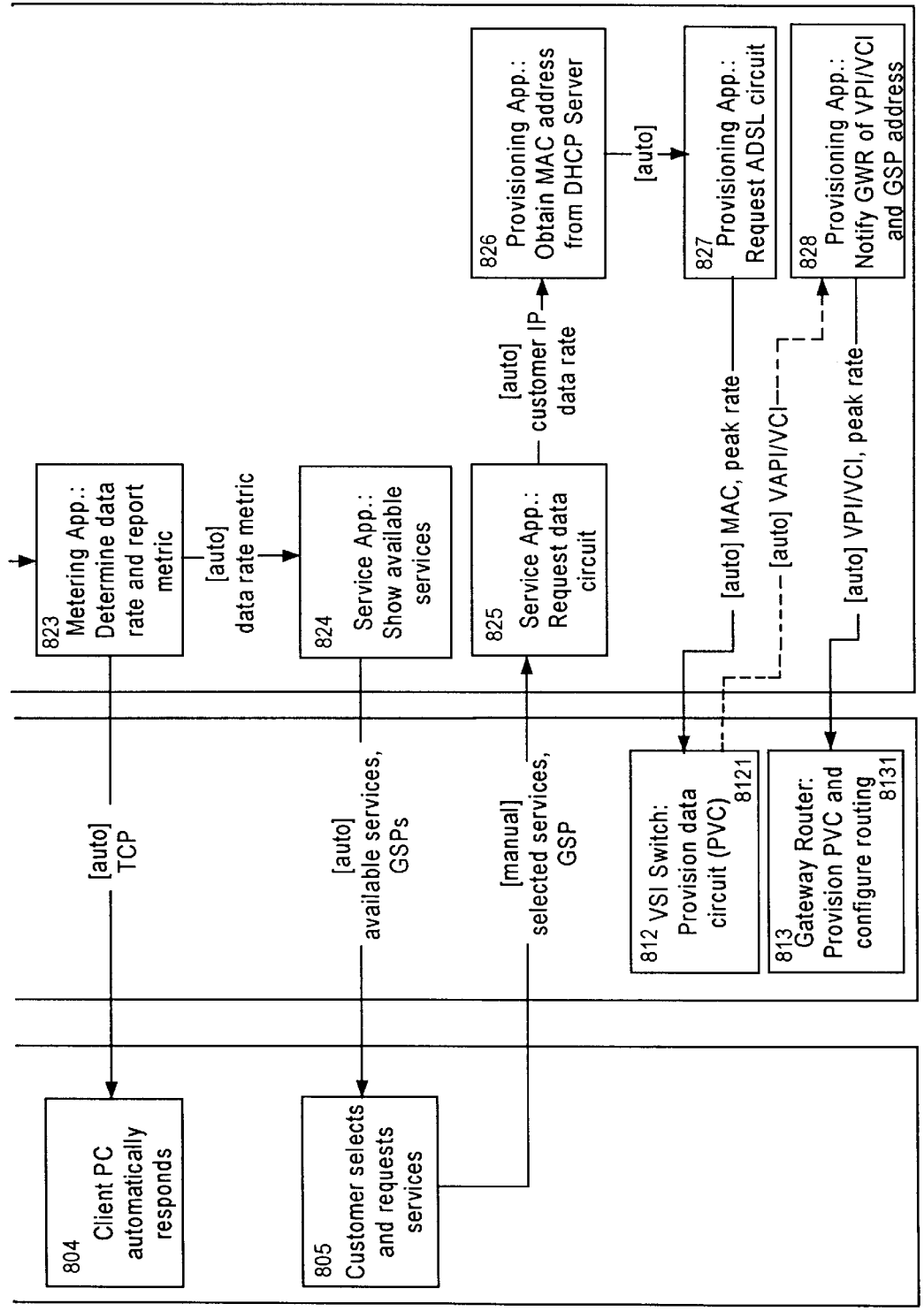
FIG. 8 is a flow-chart illustrating the steps of an example of the automated service selection and provisioning procedure.

FIG. 8 shows the actors, activities, and attendant messages involved in this exemplary method. Each activity resides in the domain of a particular actor: the customer domain 800, the carrier/PSTN domain 810, or the service domain 820.

With reference to FIGS. 7 and 8, the method begins when the customer contacts the carrier and requests ADSL service (step 801). The carrier connects the ADSL circuit (step 811), which entails moving the customer's POTS circuit to the ADSL frame at the remote terminal or central office, and cross-connecting back to the switch frame.

In step 802, after receiving and setting up the ADSL equipment and concomitant software, the customer starts an IP session over the ADSL line. In doing so, the customer's PC 25 (acting as a DHCP client) automatically requests and negotiates an IP address (step 8211) and other operational parameters with a DHCP server 81 in the network services domain 33. This IP address obtained in step 8211 is temporary, as it is used solely for the purpose of establishing a session. Later, the customer will receive a permanent or session IP address from its ISP/Global Service Provider (GSP) 11'.

In step 803, the customer uses the Web browser application 83 to access one or more of the network service provider's service pages via the PC 25, for example, from the web server 85 on the vertical services domain 13. In order to avail the customer of the services and GSPs 11' that will work acceptably well on the customer's particular ADSL line 21, the Service Application 91, determines the available services by acquiring a bandwidth metric (e.g. packet rate) from the Metering Application 93 (step 822). As shown in steps 823 and 804, the Metering Application 93 employs an interactive method for determining the maximum data rate. This rate determining method may be based on a dampened oscillation algorithm, and may employ the mechanisms inherent to TCP. In the preferred embodiment, the Metering Application 93 should be in the core of the service domain 13 or 33 so as to measure the TCP/IP packet rate between the subscriber equipment and the respective services domain. However, other metering application techniques may be used from the same or other locations.

In step 824, the Service Application 91 sends a Web page to the customer, populated with the available services and identifications of the GSPs. In step 805, the customer selects services and one (1) primary GSP. Step 824 involves a determination of the customer's data rate, which will be the lower of the metered rate and a rate based on the customer-selected services.

In step 825, the Service Application 91 receives the customer's selections, and requests the data circuit by sending customer's IP address and data rate. In step 826, the Provisioning Application 95 obtains the customer's MAC address from the DHCP server 81.

In step 827, the Provisioning Application establishes communications with the vertical services insertion (VSI) ATM switch 19, and may use a script or other remote mechanism to either request the appropriate data circuit, or set up the data circuit (8121). The data circuit will have an association with the customer's MAC address, and will have a provisioned peak rate no less than that initially determined by the Service Application 91.

In step 828, the Provisioning Application 95 receives the logical circuit information (or VCI/VPI) for the customer, and subsequently communicates with the gateway router 29 to set up the appropriate logical circuit (or VPI/VCI) for the customer (step 8131). In step 813, the gateway router 29 may set up the circuit in response to a request from the Provisioning Application, or may be controlled by the Provisioning Application. The Provisioning Application 95 may similarly communicate with the switch 19 or the DSLAM 17, as appropriate, to provision the customer circuit. Thus, the customer has a PVC that traverses the exemplary ADSL data network, and this PVC was set up using the automated method presented here.

Certain aspects of the invention relate to the software elements, such as the combination of the Service Application 91, the Metering Application 93 and the Provisioning Application 95, shown in FIG. 7. Other aspects of the invention relate to software elements of the CPE device 22, as discussed more below. At different times all or portions of the executable code for any or all of these elements may reside in physical media or be carried by electromagnetic media. Physical media include the memory of the server(s) 85, 87, or the CPE device 22 such as various semiconductor memories, tape drives, disc drives and the like of general-purpose computer systems. All or portions of the software may at times be communicated through various networks, for example to load the software from another computer into the respective CPE device or server, or into another network element. Thus, another type of media that may bear the software includes optical, electrical and electromagnetic waves, such as used across physical interfaces between local devices, through wired and optical landline networks and over various air-links.

In the ADN depicted in FIG. 2, a customer's PC 25 was described that utilizes one or more protocol stacks to encapsulate IP datagrams, or other higher level data, in an Ethernet frame using an appropriate Ethernet type. In particular, the PC 25 included a protocol stack with a PPPoE shim that encapsulates and decapsulates data between a PPP layer and an Ethernet layer of the protocol stack. The resulting PPPoE Ethernet frames as well as other ethertype frames are exchanged between the PC 25 and an ATU-R 23 to communicate with the carrier's network.

With the different protocol stacks residing on the PC 25, customers could unintentionally disable PPPoE functions during routine configuring of the PC 25, performing operating system upgrades, or installing additional software applications. Also, in the embodiment of FIG. 2, each device is responsible for providing an appropriate PPPoE shim in order for that device to communicate, through the ADN, with remote Internet sites. While conventional PCs can easily include such functionality, other intelligent devices such as toasters, IP phones, climate systems and security systems do not necessarily include PPPoE shim functionality.

An alternative embodiment of the present invention is now described that addresses some of the concerns that can arise from placing the PPPoE shim functionality on the PC 25. In this alternative embodiment, depicted in FIG. 9, VSI customer premises equipment (CPE) 902 is coupled with the ATU-R 904 to provide some of the Ethernet encapsulating function previously performed by the PC 25. FIG. 9 illustrates the CPE 902 and the ATU-R 904 as a logical unit; these logical units, however, can be combined in various equivalent physical arrangements. For example, the ATU-R can include upgradeable firmware that can be augmented to permit the ATU-R 904, in addition to its conventional functions, to provide the functions of the CPE 902. The CPE 902 can be a stand-alone hardware piece located between the home network 906 and the ATU-R 904. The CPE 902 can also be a hardware apparatus that physically connects to interfaces on the ATU-R 904 or, depending on the modularity of the ATU-R 904, the CPE 902 could be a plug-in module that connects to a chassis or bus of the ATU-R 904.

In operation, devices $901_1$–$901_4$, connected over a home LAN 906, communicate with the CPE 902 via conventional Ethernet, or other data-link layer, frames. While native Ethernet devices $901_1$–$901_4$ are preferred, devices configured for other network types, such as HPNA, can be used along with a frame translator that bridges signals between Ethernet and the other network type. The Ethernet, or other data-link layer, frames received by the CPE 902 have IP, or other network-layer, datagrams, with a destination address and other higher layer information, encapsulated within. In response to receiving Ethernet, or other data-link layer, frames from the network 906, the CPE 902 generates Ethernet, or other data-link layer, frames that are then encapsulated in ATM cells according to the underlying Layer 2 architecture of the ADN and forwarded via the DSL link 908 to a VSI device 910. As described earlier, the VSI device routes the Ethernet, or other data-link layer, frames according to the type identifier (e.g., ethertype) within the frames to a vertical service domain locally connected to the VSI device 910 or to the Internet via a gateway router 912.

In generating, for example, Ethernet frames, the CPE 902 examines upper layer information within the frame received via the home LAN 906 and determines the appropriate ethertype encapsulation according to the service on the ADN to which that Ethernet frame is destined. The CPE 902 then generates an Ethernet frame according to the appropriate ethertype just determined. This generated Ethernet, or data-link layer, frame is forwarded over the ADN according to the underlying layer 2 architecture (also a data-link layer) of the ADN. In this manner, each device $901_1$–$901_4$ need only include conventional Ethernet based protocol stacks, with the CPE 902 providing the shim software to alter data-link layer frames. Thus, the PPPoE shim software, in the Ethernet example, is protected from misconfiguration and damage caused by a customer's activities.

The table 920 illustrates one exemplary scheme for the CPE 902 to determine the appropriate ethertype encapsulation for a received frame. The table 920 depicts a modified version of a routing table which is typically found (in unmodified form) in devices with TCP/IP protocol stacks communicating over Ethernet networks. Each row of the table 920 is an entry for a particular destination IP network. The left-most column 922 identifies the network or domain to which a particular table entry applies. The middle column 924 identifies a subnet mask that is typically used to specify how many bits of an IP address to use when searching for a matching table entry. The right-most column 926 identifies the ethertype appropriate for a particular table entry (i.e., IP network). The first entry (network 0.0.0.0) is typically considered the default route; this means that if an explicitly matching entry is not found in the table 920 then this default entry is used. As shown, the default ethertype is PPPoE which, according to one VSI embodiment described herein, denotes Ethernet frames ultimately destined for the Internet. The next two entries identify private IP networks, such as those used in the central office to provide inserted vertical services, local network services and/or VLAN services. As shown, Ethernet frames destined for the networks providing the various local or vertical services are encapsulated in an Ethertype other than PPPoE. The VSI device 910 is able to route the frames appropriately based on the frames' ethertypes.

The table 920 is exemplary in nature and is not intended to limit the scope of what upper layer information can be used to determine the appropriate encapsulation ethertype. Information from the transport layer, or even the application layer, could be used by the CPE 902 for ethertype determinations.

Figure 10:
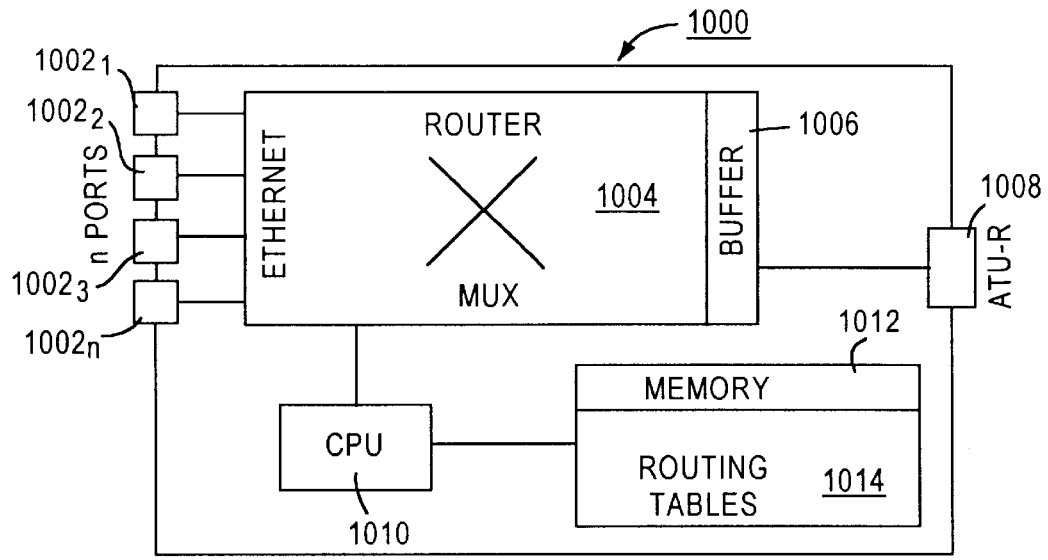
FIGS. 10 and 11 illustrate a detailed schematic and logical view, respectively, of the features within the CPE of FIG. 9.

FIG. 10 illustrates a schematic hardware view of a CPE/ATU-R device 1000 according to an embodiment of the present invention. The circuitry for performing the conventional functions of an ATU-R or a router are not illustrated in the apparatus of FIG. 10 as these functions are not critical to an understanding of the innovative aspects of the CPE 1000. For example, the SAR circuitry for exchanging ATM cells to and from the upstream side of the ATU-R is not shown. Similarly, the circuitry for examining a downstream packet to determine which Ethernet port interface to forward the packet to is not shown in detail.

LAN interface ports $1002_1$–$1002_4$ communicate with devices on a home (i.e., customer location) network preferably using conventional Ethernet frames that encapsulate higher layer data. Ethernet frames received via the interfaces $1002_1$–$1002_4$ are forwarded to the router, or multiplexer, circuitry 1004. A processor 1010, or other equivalent circuitry, then examines the higher layer data encapsulated within the Ethernet frame to determine an intended network destination. From the intended destination, a matching table entry, from a table 1014 stored in the memory 1012, is identified. Based on the identified table entry, the Ethernet frame is encapsulated according to one of a variety of ethertypes. The encapsulation according to the different ethertypes performed by the CPE device 1000 can range from being as complex as restructuring the entire frame and its header to as simple as altering, or setting, a multi-bit "type indicator" field within the frame's header. The appropriately encapsulated Ethernet frame is then forwarded out the ATU-R 1008. Buffer 1006 is shown as a part of the router circuitry 1004 in consideration that encapsulation and unencapsulation of Ethernet frames takes a finite period of time in which other frames can be received. As well understood in network switches, the buffer 1006 prevents the loss of data during the processing of incoming and outgoing Ethernet frames.

With respect to downstream traffic, the CPE 1000 can detect the ethertype of a received frame without reference to a routing table and therefore can automatically translate between the incoming ethertype and the conventional ethertype used by the home LAN. However, the router 1004 does function to determine the appropriate interface $1002_1$–$1002_4$ to forward a frame to based on which interface $1002_1$–$1002_4$ the downstream destination device is connected to. Accordingly, the CPE device 1000 can perform session proxy functions such as network address translations and other routing procedures.

Figure 11:
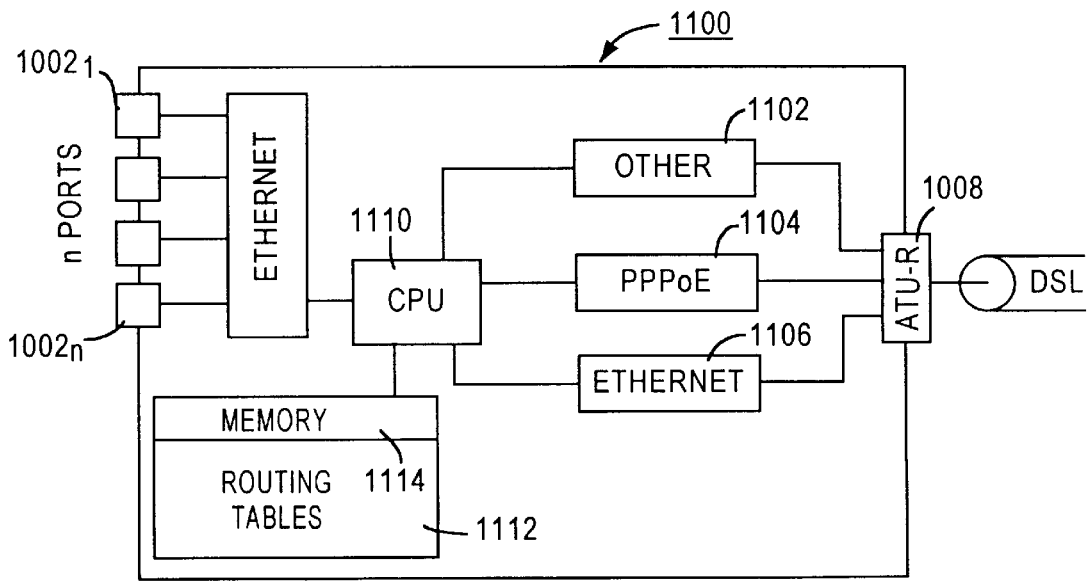

FIG. 11 depicts a more logic-level view of the CPE/ATU-R device described in relation to FIG. 10. The different ethertypes can be thought of as logical ports. Analogous to a typical network switch, an incoming frame is analyzed by the CPU that implements a switching function to determine the appropriate outgoing interface. Instead of multiple physical output interface ports being the possible destinations, logical ports 1102, 1104 and 1106 are the possible output destinations to select from. Each of these logical ports represents different level 2 encapsulation software of a protocol stack, or stacks. In operation, the CPU 1110 analyzes upper layer information within a received Ethernet frame to determine which logical port 1102–1106 to forward the frame to. The CPU 1110 consults data 1112 in a memory 1114 in determining the appropriate logical port. As a result of being forwarded to the different logical ports, different Ethernet frames are encapsulated as different ethertypes. Within the VSI environment, therefore, the different frames can be routed to either vertical services or conventional Internet-based services domains based on their ethertypes.

In addition to the benefits previously mentioned, the placement of the PPPoE shim functionality out on the CPE device provides a number of other advantages.

Security of the home network can be enhanced utilizing the CPE with the PPPoE shim functionality. Most routers have firewalling capabilities that are typically implemented via an access control list (ACL) mechanism. The table 930 illustrates an exemplary security table that has entries corresponding to MAC addresses of the devices $901_1$–$901_4$ on the home network 906. Each entry includes a MAC address and a corresponding rule. While the precise syntax of the rules differs among different vendors, the rules typically specify what destination and origination equipment can communicate with a particular MAC address. According to one aspect of the present invention, the ACL rules can be extended to identify what types of ethertype encapsulation are allowed for the different devices $901_1$–$901_4$ of the LAN 906. For example, a PC will likely communicate with the vertical services domain as well as the Internet, but a home security system probably will only communicate with the vertical services domain. Accordingly, a security table entry can be created to prevent PPPoE (i.e., Internet) sessions from being started by, or received by, the security system. When processing frames, the CPE will check not only the routing table to determine the appropriate ethertype encapsulation but will also refer to the ACL to determine whether or not to process the frame at all.

In addition, having a protocol stack with a PPPoE shim located at the CPE 902, allows the CPE 902 to function as a PPPoE proxy, if desired. In a proxy arrangement, the CPE initiates a PPPoE connection to an ISP similar to the manner described earlier in conjunction with a customer's PC establishing a PPPoE link. Thus, the CPE 902 is allocated a public IP address. The different devices $901_1$–$910_4$ communicate with the CPE 902 via standard Ethernet frames which the CPE 902 encapsulates and multiplexes over the PPPoE connection (assuming the frames are destined for the Internet). Return PPPoE frames are addressed to the CPE 902 which, using conventional network address translation (NAT) methodology, demultiplexes the received return frames to the appropriate devices $901_1$–$910_4$. This proxy functionality provides the ability to share a single PPPoE link among multiple home devices $901_1$–$901_4$ and improves security by preventing direct communication with the devices $901_1$–$910_4$. Of course, the PPPoE proxy arrangement is optional. Devices $901_1$–$910_4$ can also independently establish their own PPPoE links so that each of them has a separate IP address and PPPoE session.

One of the significant benefits of the CPE and ATU-R equipment depicted in FIG. 9 is that upstream quality of service (QoS) can be provided. Implementing downstream QoS has been described in detail with regard to the VSI switch. A similar methodology can be utilized with regards to the upstream data. The CPE can determine the physical upstream rate of different traffic types and then prioritize and queue traffic according to predetermined traffic types. As described with regard to the VSI switch (FIG. 2, element 19), the CPE can examine each communication and determine an appropriate tag to add to an outgoing cell as part of its internal processing. Using the tags, the CPE will place each of the cells into one of a plurality of queues similar to those discussed above relative to QoS operations of the VSI switch. Thus, the order and rate at which different ethertype frames are forwarded out the ATU-R can be controlled to support QoS for various services between the customer and the carrier.

Generation and downloading of the programming information for the CPE/ATU-R 1100 can be accomplished manually via one of the customer devices connected to an Ethernet port 1002$_1$–1002$_4$. An embedded web server or similar application could be provided in the memory 1114 that communicates with the connected customer device to allow a customer to manually generate programming information such as the routing tables, ACL tables and QoS parameters. The CPE/ATU-R 1100 could also be similarly programmed via devices connected to it through the ATU-R interface 1008. In an embodiment described more fully later, the programming information is automatically generated and downloaded to the CPE/ATU-R 1100 via software extant in the local access network domain.

Figure 12:
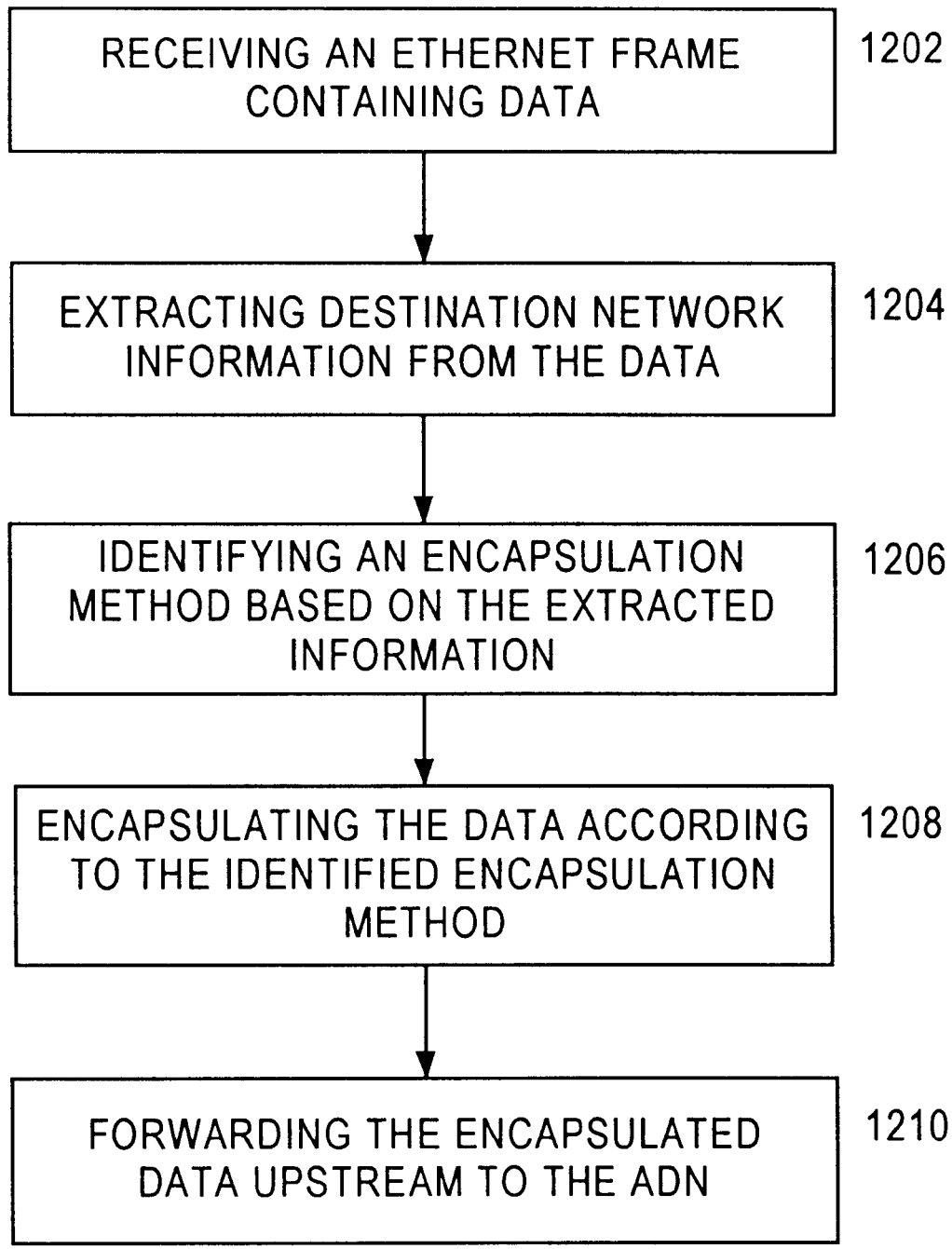
FIG. 12 is a flow-chart illustrating the steps of an example of the CPE encapsulating frames according to the intended network destination of the frame.

FIG. 12 provides a flowchart that summarizes the steps taken by the CPE in forwarding Ethernet frames to the ADN. In step 1202, an Ethernet frame is received at one of the interface ports. The Ethernet frame encapsulates datagrams. Information related to an upper-layer protocol is extracted, in step 1204, from the received frame. Examples of such information include the destination IP address encapsulated within the Ethernet frame. A set of rules (e.g., a routing table) is consulted to determine, in step 1206, what ethertype encapsulation needs to be used based on the extracted upper-layer information. Once the ethertype encapsulation method is identified, the datagram is re-encapsulated, in step 1208, using the identified ethertype encapsulation method. Once encapsulated, the frame, in step 1210, is forwarded upstream over the ADN. In performing the forwarding step (step 1210) the CPE can also consult security access control lists to identify permissible connections and sessions and block Ethernet frames when appropriate. Similarly, the CPE can also perform the forwarding step in a manner to ensure conformance with any QoS parameters associated with the upstream bandwidth.

Trained network personnel perform the complex configuration of the parameters that control the QoS functions for the downstream data of the ADN; a typical customer, however, does not have the knowledge to properly configure upstream QoS parameters. In a related point, many customer's would find it extremely difficult, if not impossible, to correctly generate ACLs, NAT information, and routing tables. One further aspect, therefore, of the architecture depicted in FIG. 9 is the capability for automatically programming the CPE based on the services a customer orders. In a preferred embodiment, the automatic programming of the CPE relies on some of the automatic provisioning software and services depicted and described in relation to FIG. 7.

The methodology relating to automatic programming of the CPE enables a customer to use a web-based software application to program the CPE. The automated interaction of a user through a web-based software application causes communications to software entities extant in one or more service domains, which coordinate the processes that will automatically configure the CPE according to both customer selected parameters and other network parameters.

Referring to FIG. 7, the user will run a standard Internet browser application 82, for example on a PC 26 or other appropriate data communication device. The web server 85 and the provisioning server 87 run one or more applications related to services selection 91 and CPE programming operations 92. Through the web interface, the user will select services that are appropriate for the devices 26 connected to the CPE/ATU-R 21. Through communication between the provisioning server 87 and other elements of the ADN, the provisioning server 87 and web server 85 will identify ethertype and corresponding network address information useful in populating a routing table such as that depicted in Table 920.

Based on the suite of services selected by a user, the provisioning server 87 and web-server 85, through coordinated processes 91, 92, 93 and 95, can also determine optimal queuing and prioritizing parameters to enable implementation of upstream QoS. The optimal queuing can be partly based on the experience and knowledge of network personnel; thus relieving the user from attempting such a difficult task.

Access to a web-based application 92 can be provided through the web-server 85 that will guide a user through the process of identifying network devices and services and in defining related security parameters, such as table 930. Preferably, this application communicates with other software elements, already described, regarding the services offered to and selected by the user so that the user is intelligently presented relevant options and alternatives while creating a security profile for use in the CPE 22. In FIG. 7, the web server 85 is depicted as running both the CPE Programming Application 92 and the Service Application 91; one skilled in the art would recognize that these two application can also be run on separate servers.

Ultimately, the security profile, the QoS parameters and the ethertype routing table will be downloaded via the ADN to the CPE 22 in order to automatically program the device. In one embodiment, a default configuration or a simple web-based interface is provided with the CPE 22 to perform the initial communications needed to initiate the communication session needed to perform a full programming of the device.

Figure 13:
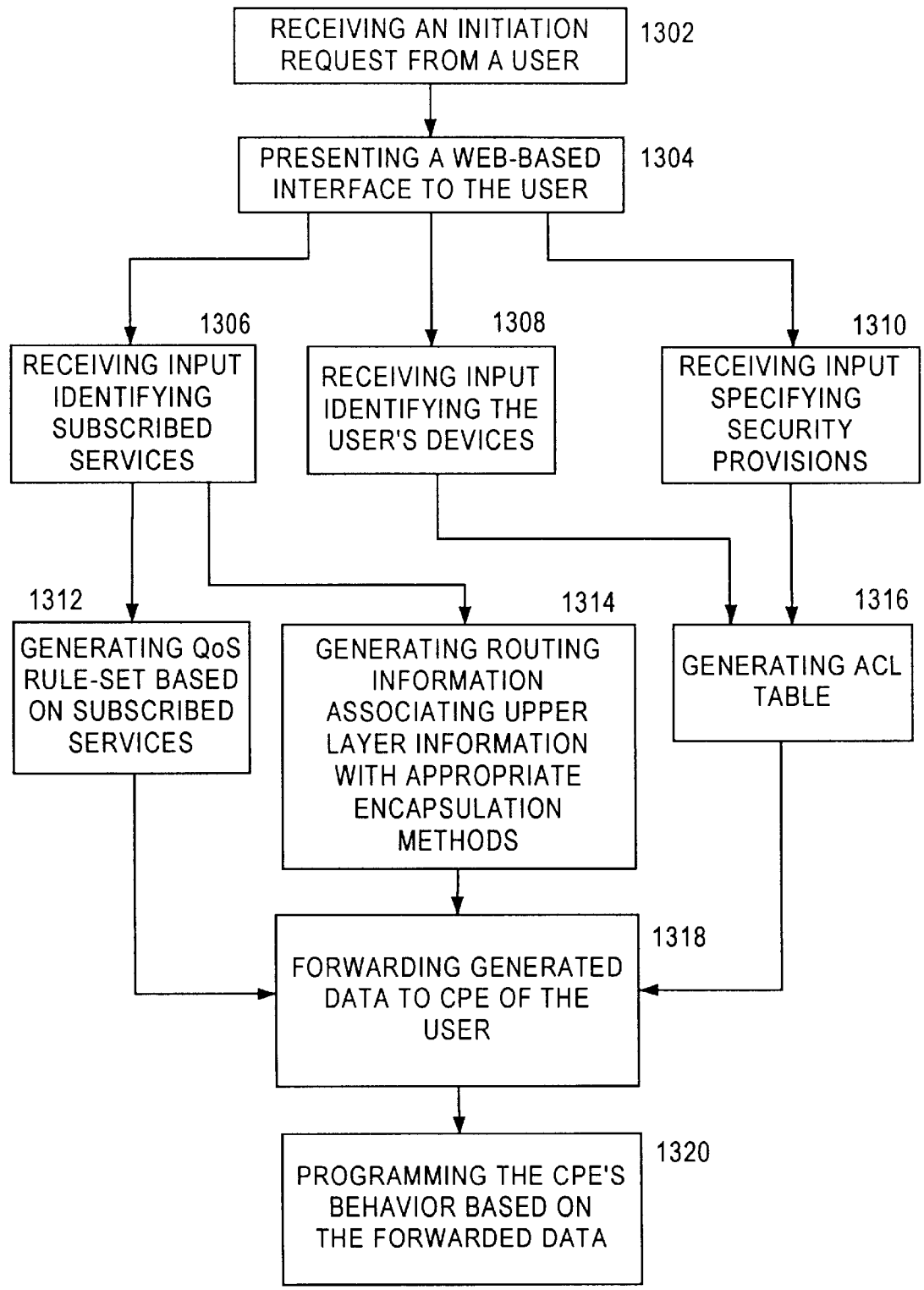
FIG. 13 is a flowchart illustrating the steps of an example of automatically programming the CPE according to the services used by a customer.
Figure 14:
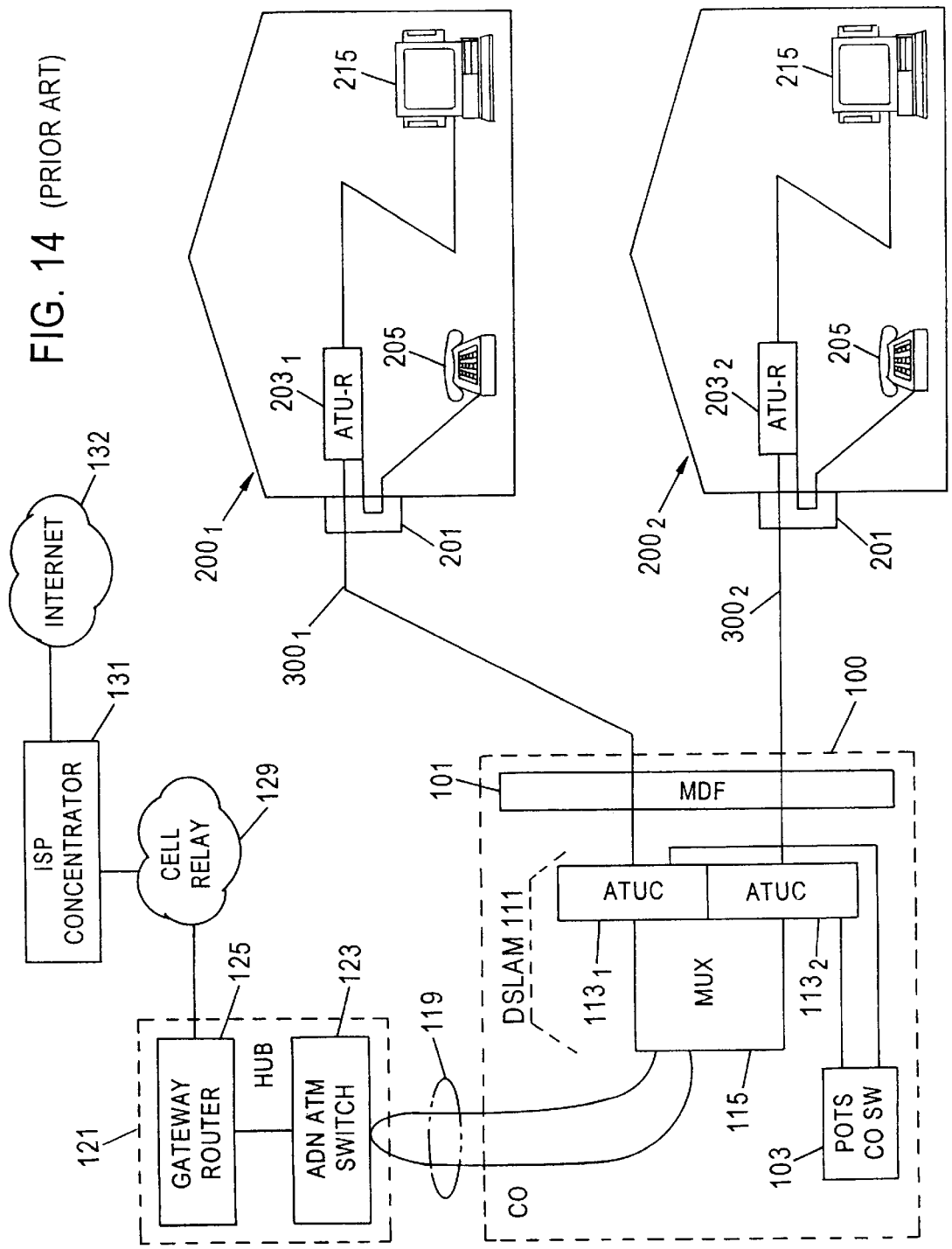
FIG. 14 a block diagram of a prior art asymmetrical digital subscriber line data network.
Figure 15:
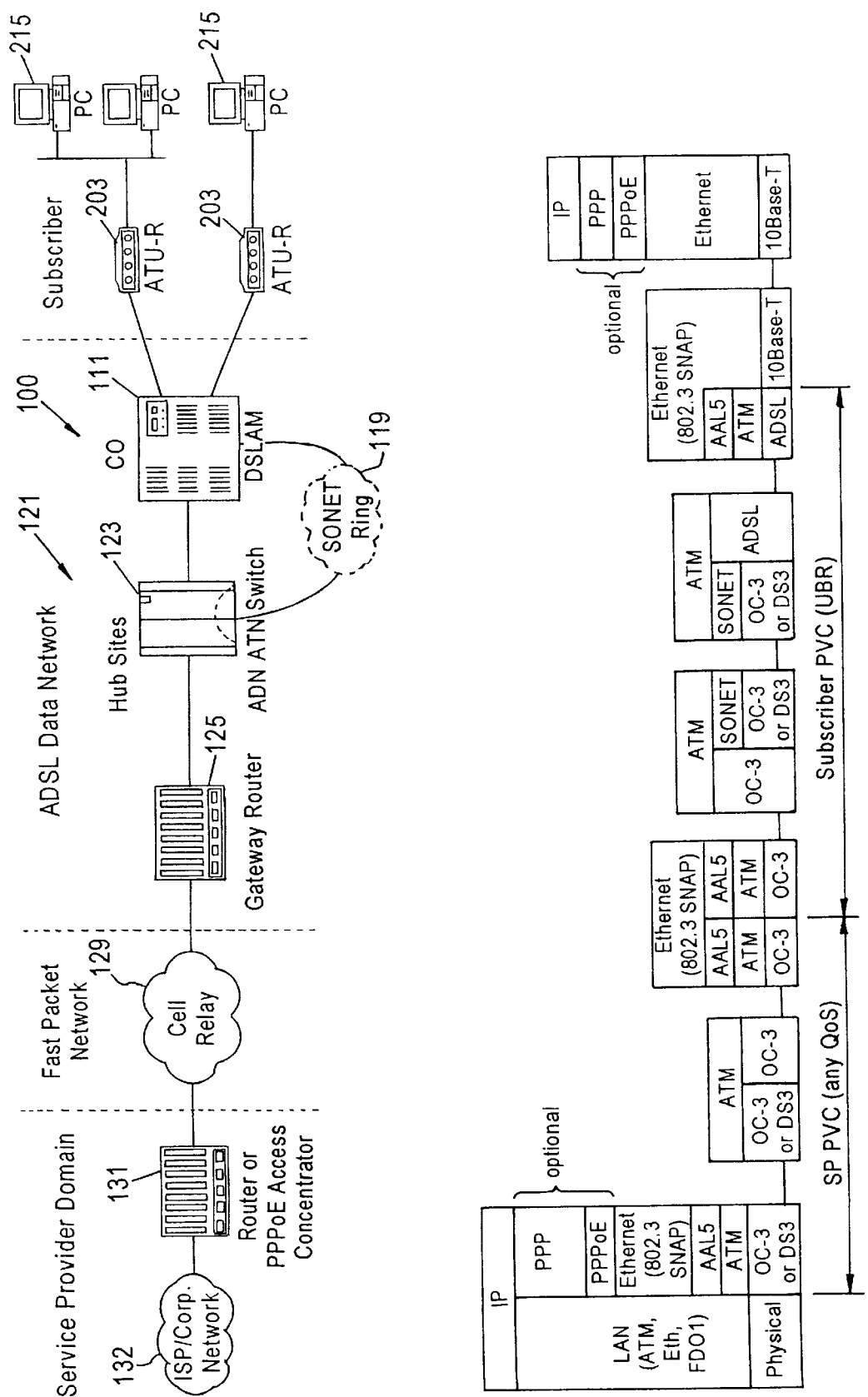
FIG. 15 is a slightly modified functional block diagram of the prior art network illustrating the protocol stacks used in the various network elements.

FIG. 13 depicts the logical flow of the software processes extant in the ADN that provide automatic programming of the CPE. A user, preferably via a web browser, connects (step 1302) to a web-server front end that coordinates the gathering of data needed to program the CPE. From web pages served (step 1304) by the front-end, the user can direct the gathering of relevant information. In particular, information relating to the services used by the customer, the devices present at the customer's location and the security preferences of the user must all be gathered (steps 1306, 1308 and 1310). The information does not necessarily have to be manually entered by the customer. Through other communication paths in the ADN the web server can identify those services subscribed to by a customer as well the upstream network bandwidth requirements of those services. Similarly, the CPE and the customer device's are connected via the home network. Using such a connection MAC addresses and information regarding the devices can be gathered by the CPE and automatically passed to the web server front-end. Using the gathered information, a graphical, or other intuitive interface, can be presented to the customer to aid with the selection of meaningful and appropriate security Access Control Lists (ACL). Once all the information is gathered, the web server can generate, or access a back-end application that can generate, data formatted in a manner that can automatically program the CPE. Exemplary data that can be generated are the rule-sets that permit prioritizing and queuing to meet QoS constraints (step 1312), routing tables that associate a particular encapsulation method with network destination information extracted from a received frame (step 1314), and security tables that specify permissible communication target addresses, source addresses and session encapsulation types (step 1316). Once appropriately formatted data is generated, this data can be forwarded through the ADN of this particular user (step 1318). Upon receipt of the programming data at the CPE, the behavioral characteristics and parameters of the CPE are modified according to the downloaded programming (step 1320).

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A Customer Premises Equipment located between an access data network, providing access services to at least two network domains, and one or more customer devices that utilize services provided over the access data network, comprising:
   a first interface for receiving a first frame from the one or more customer devices;
   a second interface for forwarding a second frame upstream to the access data network, said second frame encapsulated according to a selected one of a plurality of encapsulation methods;
   a decision table for storing a correlation between each of a plurality of upper-layer network data and a respective encapsulation method;
   a circuit configured to:
      extract upper-layer network data from the first frame;
      identify a table entry corresponding to the extracted upper-layer network data; and
      determine the selected one encapsulation method associated with the identified table entry; and
      a protocol stack for encapsulating data within the first frame into the second frame according to the selected one encapsulation.

2. The Customer Premises Equipment according to claim 1, wherein the circuit comprises a switch and the first interface includes a plurality of interface ports coupled to the switch for communicating with the one or more customer devices.

3. The Customer Premises Equipment according to claim 1, wherein the circuit comprises a router and the first interface includes a plurality of interface ports coupled to the router for communicating with the one or more customer devices.

4. The Customer Premises Equipment according to claim 1, wherein the protocol stack is configured to generate said second frame by modifying a type-identifier field within a header of said first frame if necessary to conform to the selected one encapsulation method.

5. The Customer Premises Equipment according to claim 4, wherein the type identifier field identifies one of a plurality of different ethertypes.

6. The Customer Premises Equipment according to claim 1, further comprising:
   a DSL modem coupled between the second interface and the access data network.

7. A Customer Premises Equipment located between an access data network, providing access services to at least two network domains, and one or more customer devices that utilize service provided over the access data network, comprising:
   a first interface for receiving a first frame from the one or more customer devices, said first frame comprising a payload and a first header;
   a second interface for forwarding a second frame upstream to the access data network, said second frame comprising the payload and a second header;
   a decision table for specifying a correlation between each of a plurality of types of upper-layer network data and a respective frame-type identifier;
   a circuit configured to:
      extract upper-layer network data from the first frame;
      identify a decision table entry corresponding to the extract network data; and
      determine a selected one frame-type associated with the identified table entry; and
   a protocol stack for generating the second header by modifying the first header, if necessary, according to the selected one frame-type.

8. A method for providing upstream data frames from a Customer Premises Equipment, comprising the steps of:
   the Customer Premises Equipment receiving, from a customer device that utilizes services over an access data network that provides access services to at least two network domains, a first data-link layer frame containing encapsulated data;
   using the Customer Premises Equipment to:
      extract network services information from the encapsulated data, said network services information originating in a protocol layer higher than the data-link layer;
      identify a selected one of a plurality of data-link layer encapsulation methods based on the extracted network services information;
      modify the encapsulated data by encapsulating it into a second data-link layer frame according to the selected one data-link layer encapsulation method; and
      forward the second data-link layer frame upstream via the access data network;
   wherein the Customer Premises Equipment is located between the access data network and the customer device, and the forwarding step comprises assigning a priority to the second data-link layer frame based on a network service associated with the data encapsulated into the second data-link layer frame.

9. The method according to claim 8, wherein the step of modifying consists essentially of modifying a value of a type-identifier in a header of said first data-link layer frame.

10. The method according to claim 9, wherein the type-identifier specifies one of a plurality of ethertypes.

11. The method according to claim 8, further comprising the step of:
   queuing the second data frame in one of a plurality of queues based on the assigned priority.

12. The method according to claim 8, wherein the step of forwarding the second data frame is performed according to QoS guidelines associated with the data encapsulated into the second data-link layer frame.

13. The method according to claim 8, wherein the extracted network services information comprises a layer 3 destination network address.

14. The method according to claim 8, further comprising the steps of:
   receiving a downstream third data-link layer frame from the access data network containing encapsulated data;
   encapsulating the encapsulated data of the third data-link layer frame into a fourth data-link layer frame according to an encapsulation method compatible with the customer device; and
   forwarding the fourth data-link layer frame downstream to the customer device.

15. The method according to claim 8, further comprising the steps of:
   receiving a downstream third data-link layer frame from the access data network containing encapsulated data;
   identifying one of a plurality of customer devices for receiving the encapsulated data of the third data-link layer frame;
   forwarding the encapsulated data of the third data-link layer frame to the identified one customer device.

16. The method according to claim 8, further comprising the steps of:
   determining if the customer device has authority to participate in a communication session with a destination associated with the data encapsulated within the first data-link layer frame; and
   performing the modifying step and the forwarding step only if the customer device is determined to have the authority to participate in a communication session with the destination.

17. The method according to claim 16, wherein the step of determining if the customer device has authority includes the steps of:
   identifying a MAC address associated with the customer device;
   identifying authorized encapsulation methods associated with the identified MAC address; and
   granting authorization if the authorized encapsulation methods include the selected one encapsulation method.

18. A computer readable medium bearing instructions for providing upstream data frames from a Customer Premises Equipment, said instructions being arranged to cause one or more processors of the Customer Premises Equipment upon execution thereof to perform the steps of:
   the Customer Premises Equipment receiving, from a customer device that utilizes services over an access data network that provides access services to at least two network domains, a first data-link layer frame containing encapsulated data;
   using the Customer Premises Equipment to:
      extract network services information from the encapsulated data, said network services information originating in a protocol layer higher than the data-link layer;
      identify a selected one of a plurality of data-link layer encapsulation methods based on the extracted network services information;
      modify the encapsulated data by encapsulating it into a second data-link layer frame according to the selected one data-link layer encapsulation method; and
   forward the second data-link layer frame upstream via the access data network;
   wherein the Customer Premises Equipment is located between the access data network and the customer device, and the forwarding step comprises assigning a priority to the second data-link layer frame based on a network service associated with the data encapsulated into the second data-link layer frame.

19. The computer readable medium according to claim 18, wherein the step of modifying consists essentially of modifying a value of a type-identifier in a header of said first data-link layer frame.

20. The computer readable medium according to claim 19, wherein the type-identifier specifies one of a plurality of ethertypes.

21. The computer readable medium according to claim 18, wherein said instructions being further arranged to cause the one or more processors of the Customer Premises Equipment upon execution thereof to perform the additional steps of:
   queuing the second data-link layer frame in one of a plurality of queues based on the assigned priority.

22. The computer readable medium according to claim 18, wherein the step of forwarding the second data-link layer frame is performed according to QoS guidelines associated with the data encapsulated into the second data-link layer frame.

23. A method for providing upstream data frames from a Customer Premises Equipment, comprising the steps of:
   the Customer Premises Equipment receiving from a customer device that utilizes services over an access data network that provides access services to at least two network domains, a first Ethernet frame containing an IP datagram;
   using the Customer Premises Equipment to:
   extract an IP destination address from the IP datagram;
   forward, if the extracted IP destination address corresponds to an address in a vertical services domain, the IP datagram to the access data network in an Ethernet frame identified by a first ethertype; and
   forward, if the extracted IP destination address corresponds to an address in an Internet domain, the IP datagram to the access data network in an Ethernet frame identified by a second ethertype, different from the first ethertype;
   wherein the Customer Premises Equipment is located between the access data network and the customer device and the forwarding steps comprise assigning a priority to the Ethernet frame identified by the first ethertype or the second ethertype based on a network service associated with data in the Ethernet frame identified by the first ethertype or the second ethertype.

24. The method according to claim 23, further comprising the step of:
   verifying that an entry in a security table authorizes forwarding the IP datagram to the access data network.

25. The method according to claim 23, wherein the second ethertype is point-to-point protocol over Ethernet.

26. The method according to claim 25, further comprising the step of:

establishing a single PPPoE session between the Customer Premises Equipment and a service provider in the Internet domain.

27. The method according to claim 26, wherein any Ethernet frames forwarded to the access data network are forwarded upstream over the single PPPoE session.

* * * * *